United States Patent [19]
Kleinberger et al.

[11] Patent Number: 5,973,831
[45] Date of Patent: Oct. 26, 1999

[54] SYSTEMS FOR THREE-DIMENSIONAL VIEWING USING LIGHT POLARIZING LAYERS

[76] Inventors: Paul Kleinberger; Ilan D. Kleinberger, both of 4 Hamaapilim, 92545 Jerusalem, Israel

[21] Appl. No.: 08/589,510

[22] Filed: Jan. 22, 1996

[51] Int. Cl.⁶ .......................... G02B 27/26; H04N 13/04
[52] U.S. Cl. ............................................. 359/465; 348/58
[58] Field of Search ................................. 359/465, 464, 359/501, 462; 348/58, 54, 51

[56] References Cited

U.S. PATENT DOCUMENTS

| | | | |
|---|---|---|---|
| 2,218,875 | 10/1940 | Parsell | 359/465 |
| 2,631,496 | 3/1953 | Rehorn | 359/465 |
| 2,820,395 | 1/1958 | Rehorn | 359/464 |
| 4,671,632 | 6/1987 | August. | |
| 4,719,507 | 1/1988 | Bos. | |
| 4,744,633 | 5/1988 | Sheiman | 359/465 |
| 4,792,850 | 12/1988 | Liptoh et al.. | |
| 4,807,965 | 2/1989 | Garakani. | |
| 4,957,351 | 9/1990 | Shioji. | |
| 5,113,285 | 5/1992 | Franklin et al.. | |
| 5,126,878 | 6/1992 | Trumbull. | |
| 5,146,246 | 9/1992 | Marks. | |
| 5,245,319 | 9/1993 | Kilian. | |
| 5,264,964 | 11/1993 | Faris | 359/465 |

*Primary Examiner*—Jon W. Henry
*Attorney, Agent, or Firm*—Mark Friedman

[57] ABSTRACT

Systems for three-dimensional viewing aimed at full-color flat-screen binocular stereoscopic viewing without the use of eyeglasses for the viewer. According to the invention, light emanating from a display presenting a left image and a right image is directed only to the appropriate left or right eyes of a viewer using various combinations of light polarizing layers and layers of light rotating means.

8 Claims, 17 Drawing Sheets

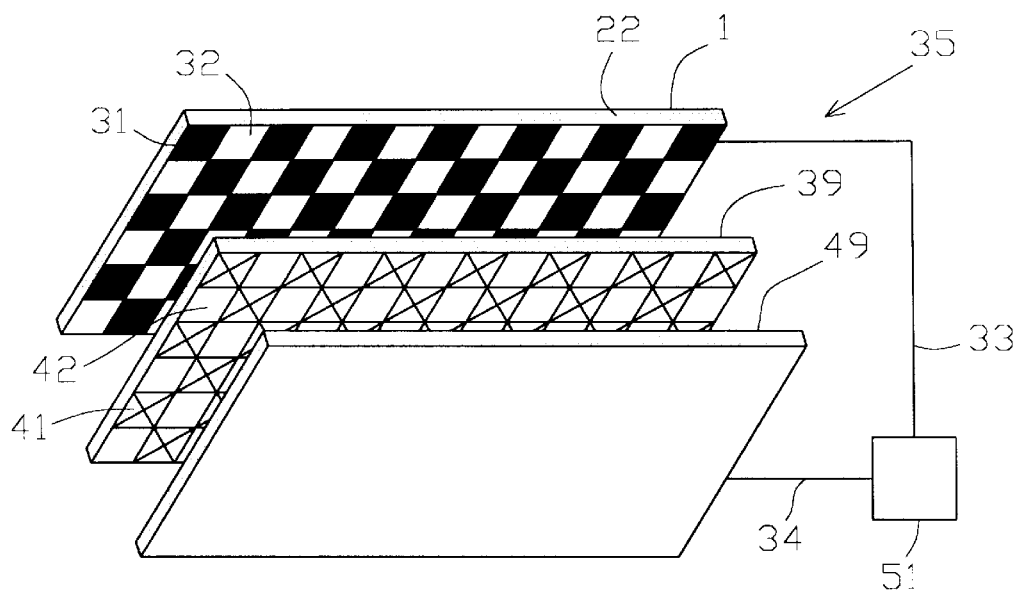
FIG. 5
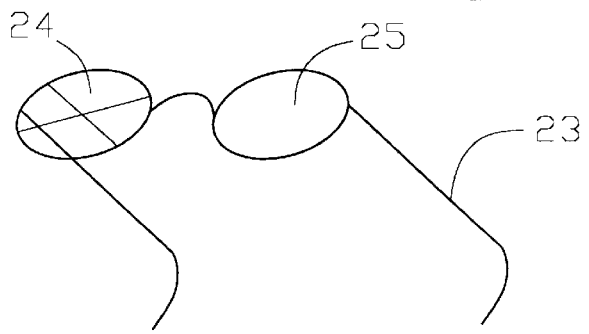
FIG. 6
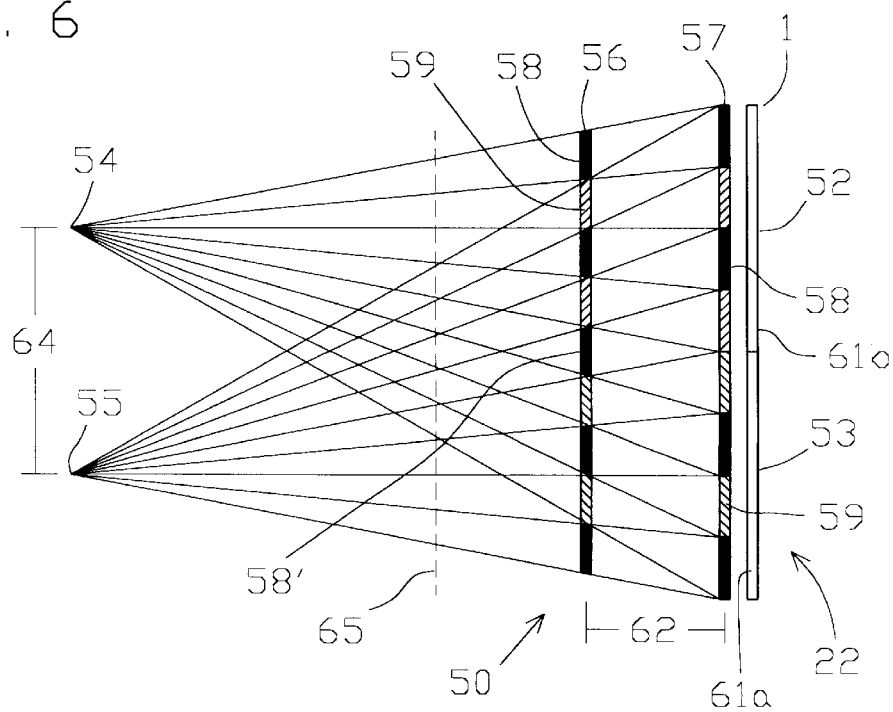

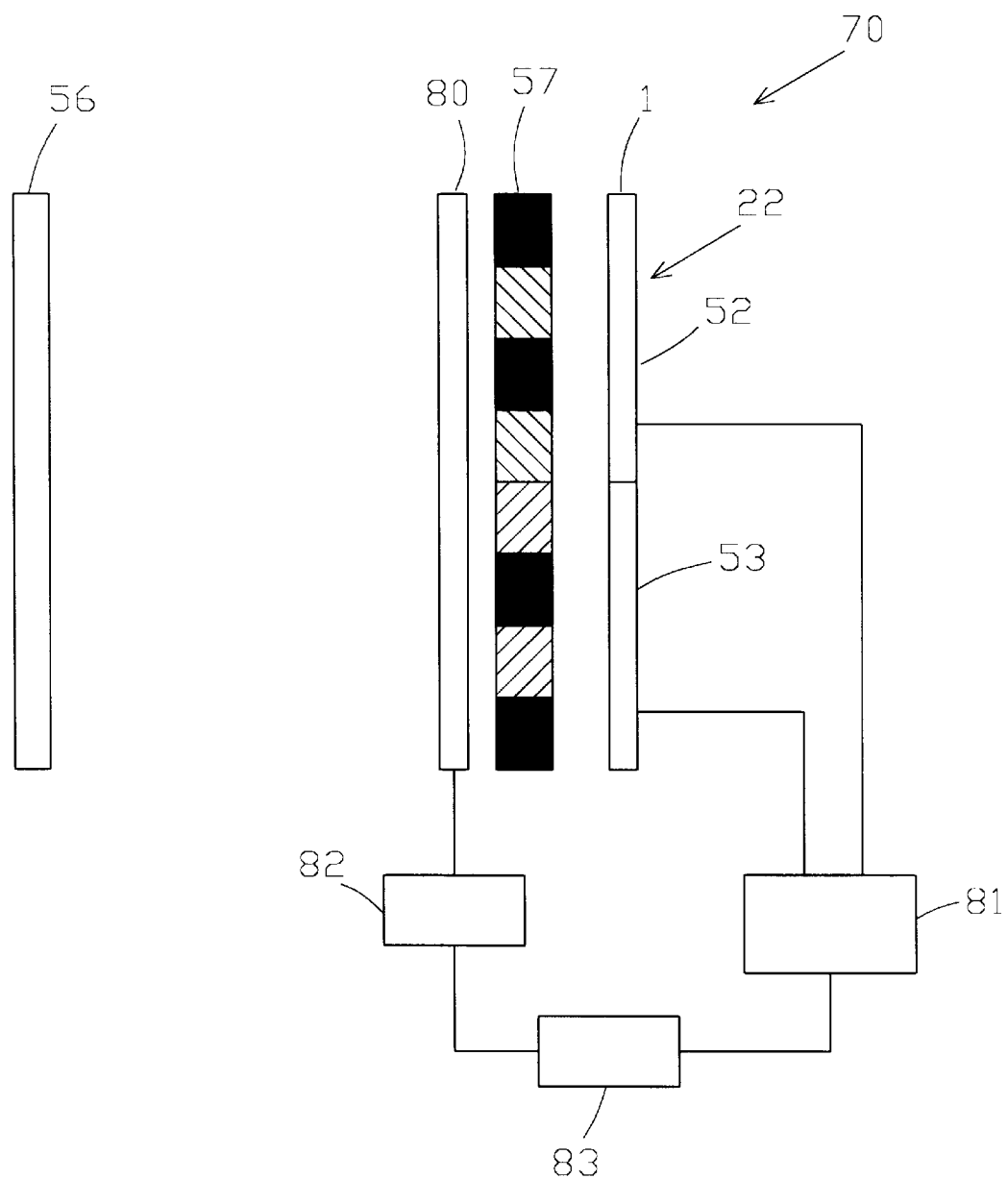

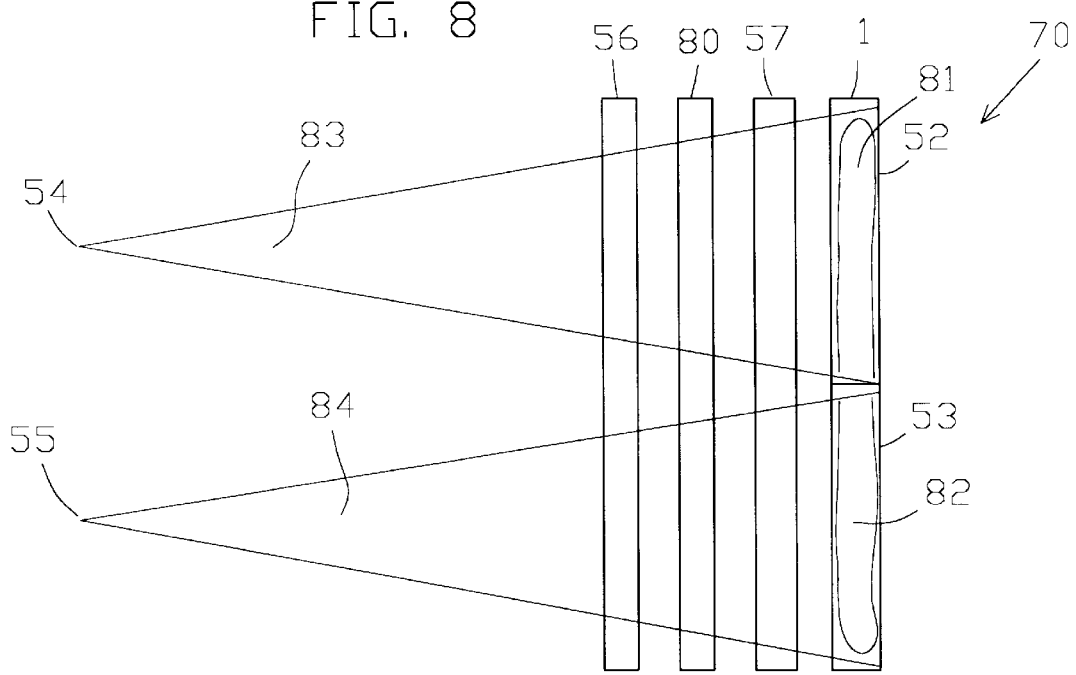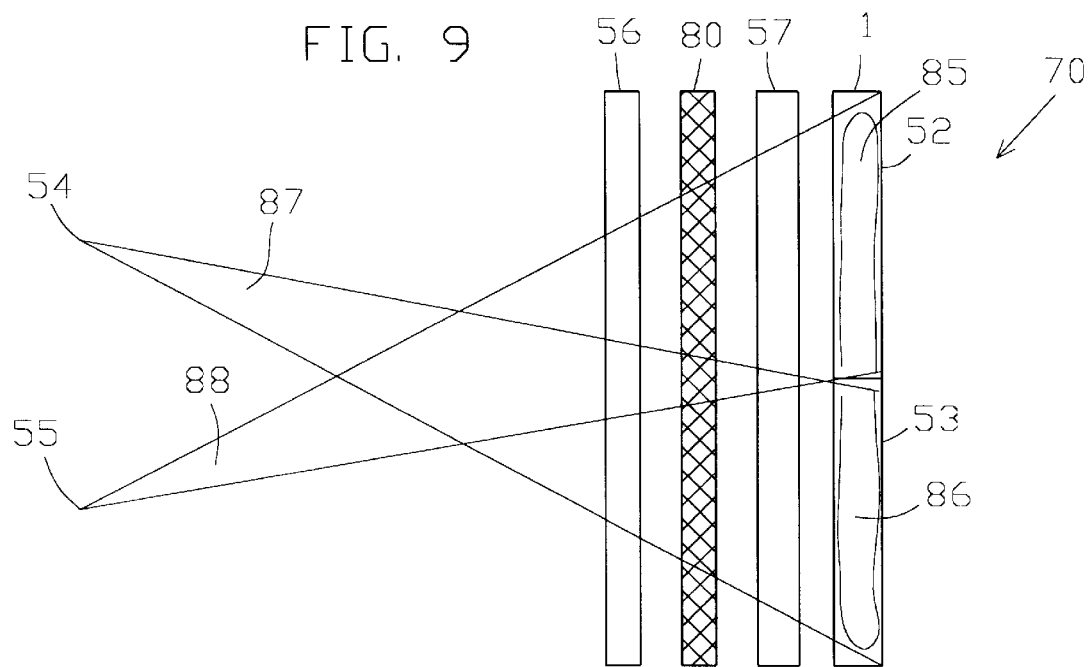

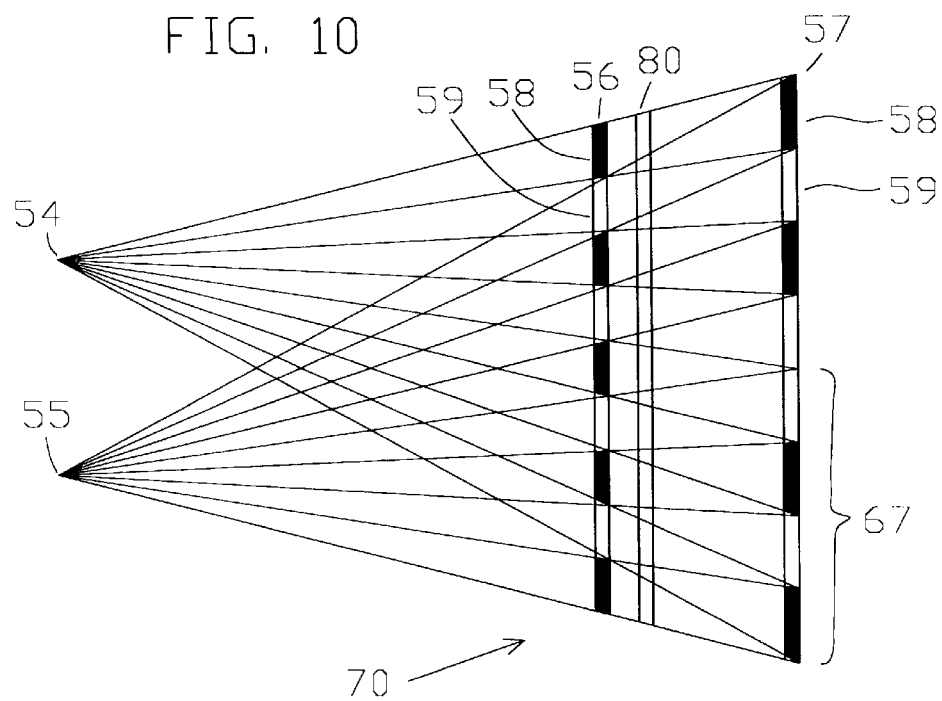
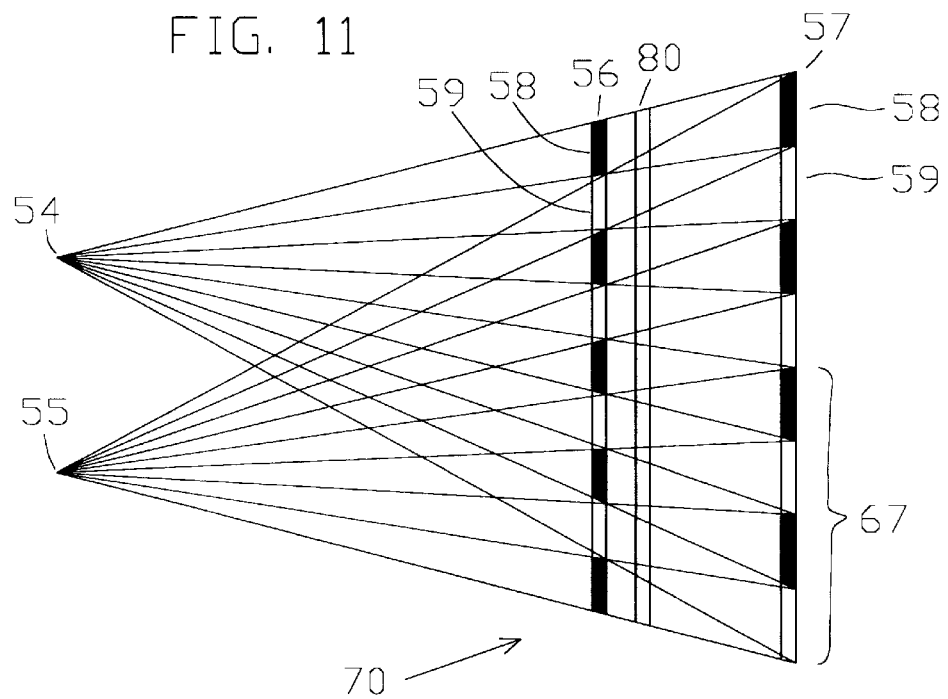

SYSTEMS FOR THREE-DIMENSIONAL VIEWING USING LIGHT POLARIZING LAYERS

FIELD AND BACKGROUND OF THE INVENTION

The present invention relates in general to systems for three-dimensional viewing. More particularly, the present invention relates to systems for three-dimensional viewing which can be used by a viewer to obtain a perception of depth while viewing still or motion pictures needless of use of eyeglasses.

Various attempts have been made over the years to develop and implement methods and apparatuses to represent scenes and objects in a manner which produces a sense of depth perception, known in the art as three-dimensionality.

Aside from methods involving rotating objects, rotating mirrors, and the like (usually classified as 'depth illusion' in the American patent classification scheme), and methods involving holographic techniques or using coherent light sources, the methods used involve a variety of schemes for transporting two different images to a viewer's left and right eyes. The two different images are typically produced by two cameras placed side by side in a manner which in turn simulates the vision of two human eyes.

The mammalian vision system, as well known, employs the differences between a given scene as perceived by the right eye and the same scene as perceived by the left eye, to extract information regarding the distance of objects within the scene relative to the viewer. Since objects close to the viewer appear displaced to the right in the view seen by the left eye, and the very same objects appear displaced to the left in the view seen by the right eye, while more distant objects show less such displacement and most distant objects show no such displacement at all, it is possible to calculate the distance of objects within the scene as a function of the amount of lateral displacement observed, and this, apparently, is what the human visual system does in our normal binocular (i.e., three-dimensional) vision of the world.

When a pair of images containing an appropriate parallax information is presented, one image to the left eye and the other to the right eye, a similar experience of apparent depth perception results. In the following, an image intended for the left eye is referred to as 'left image', and an image intended for the right as 'right image'.

The prior art of three-dimensional viewing may be broken into categories as follows. The first category includes hand-held viewing apparatuses (known in the art as 'viewers') of various sorts, based on lenses, prisms, mirrors, or combinations thereof which viewers are held close to the eyes and deliver an appropriate image to each of the eyes. The second category includes methods aimed at viewing images without optical apparatus held next to the eye (i.e. without eyeglasses and/or viewers), which methods are based on interposing a plurality of lenticular elements in the display. The third category includes systems involving eyeglasses worn by the viewer, which eyeglasses filter light according to its polarization. The fourth category includes systems involving eyeglasses worn by the viewer, which eyeglasses filter light according to wavelength (i.e., color). The fifth category includes systems involving eyeglasses worn by the viewer and employing switching mechanisms capable of rapid on/off switching (i.e., shutter systems) of optical elements. The sixth category includes side-by-side implementations such as random-dot stereograms. And finally, the seventh category includes methods employing flat screens for viewing images without a need for optical apparatus to be held next to the eye (i.e. without eyeglasses and/or viewers) and not involving lenticular surfaces. These methods are based primarily on interposing physical impediments arranged in a flat screen placed between the viewer and the image to be viewed, which impediments hide part of an image from one eye while allowing it to be seen by the other eye.

Each of the above listed categories has its associated inherent disadvantages as follows.

As far as the first category is of concern, viewing apparatuses of the sort which require lenses, prisms, or mirrors held in proximity with the viewer's eyes, are generally less convenient than alternatives which do not require special eyeware and do not require the viewer using them to hold the apparatus or to approach his eyes to special eyepieces. As the invention here disclosed involves no necessary use of lenses, prisms, or mirrors, and does nor require the viewer to look through a viewing apparatus placed or held neat the eyes, it is basically dissimilar and advantageous over apparatuses thus categorized.

As far as the second category is of concern, lenticular systems are relatively difficult and expensive to manufacture for high quality image presentation due to the amount of precision associated with their production. Evidently, lenticular systems are not well adapted for viewing systems such as computer displays and television and are therefore not in wide use. U.S. Pat. No. 4,957,351 to Shioji discloses an example of the second category, describing the use of a lenticular system, in which alternating lines representing parts of left and right images are refracted, each line through an associated lens, which directs it selectively to the right or left eyes.

As far as the third through fifth categories are of concern, they all require the use of eyeglasses or an equivalent by the viewer. The term 'eyeglasses' is referred to herein in a general sense of an optical apparatus having left and right eyepieces held close to the eyes of the viewer in such a way that substantially all the light entering the left eye is subject to an influence imposed by the left eyepiece, and all the light entering the right eye is subject to an influence imposed by the right eyepiece. As mentioned, three-dimensional systems thus categorized all require the use of eyeglasses, which select, whether by color (wavelength), timing (shutter), or polarization, the images reaching each of the eyes. These categories include apparatuses having a form of conventional eyeglasses (e.g., ones used for reading), but also include devices such as, but not limited to, pilot helmets having head-up displays (HUD), virtual-reality headgears and similar designs. As mentioned, systems falling into these categories share a common disadvantage, they all require an inherent use of special eyeglasses or a headgear. The necessity for optical apparatus held near the eyes subtracts from the pleasure, comfort and naturalness of the experience of viewing the display, and may, depending on the system used, add significantly to the expense.

As far as the third category is of concern, polarizing eyeglasses deal with arrangements in which a display system polarizes light derived from the left image in a given particular orientation and polarizes light derived from the right image in another particular orientation. Accordingly, the viewer wears a set of polarizing filters one for each eye. The filter of the left eye passes light polarized in the particular orientation in which the left image was polarized, whereas the filter of the right eye passes only light polarized in the particular other orientation in which the right image was polarized. Consequently each eye sees only the image appropriate to it and does not see the image which is inappropriate to it, thus a tree-dimensional image is viewed by the viewer. U.S. Pat. No. 5,113,285 to Franklin discloses a system using polarizing eyeglasses to provide the left and right images to the appropriate eyes. U.S. Pat. No. 4,719,507 to Bos discloses a system employing polarizing eyeglasses to distinguish between the left and right images, and also uses switchable rotating means to determine, in a temporal sequence, which image receives which polarization. These and similar systems have the disadvantage of requiring use of polarizing eyeglasses. Certain further disadvantages characterize systems which use polarizing glasses yet do not use switching means (c.f., fifth category). U.S. Pat. No. 5,050, 961 to Venolia, provides an example, and is representative of various others. According to the invention of Venolia, the display area is divided into subregions with left image and right image segments. Further according to Venolia, small polarizing subunits process the light emanating from each subregion of the display, and the division of the image into left and right image areas coincides with the orientation of the polarizing means employed in a first layer, such that all the light emanating from the right image is polarized in a first orientation, while light emanating from the left image is polarized in a second orientation perpendicular to the first orientation. The user wears polarizing eyeglasses, so that each eye sees the appropriate image segments and only those. An inherent disadvantage associated with such schemes is that part of the display surface is blocked from the view of each eye. In better cases where the image segments are small the blockage is experienced not as holes in the picture but as a graininess or low resolution of the three-dimensional image viewed. On the other hand, systems aimed at ensuring that all areas of the display space will be used in representing each of the left and right images (sequentially if not simultaneously) tend to be somewhat complex and are potentially relatively expensive to manufacture. U.S. Pat. No. 5,083,851 to MacDonald provides an example of a system with undoubted qualities but which might be expensive to implement. Yet, a system which could provide similar services in a comparatively simple and inexpensive manner would be of service in many applications.

For sake of completeness it is worthy to mention the artificial three-dimensional experience best known to the public. This is the traditional three-dimensional movie (i.e., 3D-movie), in which a projection system projects fill images of the right and left images simultaneously onto a common display (typically a reflective movie screen). Such traditional 3D-movies are presently displayed in for example Disneyland. This projection system has the advantage that each eye sees a continuous and uninterrupted image. Yet, this projection system has the disadvantages of (i) requiring the viewer to wear eyeglasses, and (ii) requiring special projection devices which involve two projectors (or a specially designed single projector having the effect of two projectors) simultaneously projecting related pairs of images onto the screen. Thus, this method calls for special projection equipment and, since it requires two separate light sources, it is not adaptable to standard computer displays nor to television displays.

As far as the fourth category is of concern, optical filters result in a right image made up of and substantially limited to particular wavelengths passed by a filter covering the right eye, and in a left image made up of and substantially limited to particular different wavelengths passed by the filter covering the left eye. Thus, in addition to the disadvantage of requiring the use of eye glasses, these systems prevent the use of natural color images.

As far as the fifth category is of concern, shutter systems are mechanisms consisting of elements capable of either blocking light or passing light, or of elements capable of rotating the orientation of polarized light (collectively referred to herein as switchable means). In both cases the mechanisms are capable of being switched on/off rapidly. In use, the switching of the mechanisms is coordinated with changes in the images being displayed, usually in such manner that the left image is displayed when the left eye's vision of the screen is enabled and the right eye's vision is blocked, and at a later time the right image is displayed when the right eye's vision is enabled and the left eye is blocked, wherein switching is intentionally rapid enough so that the persistence of human vision leaves the viewer with an impression of a continuous image. It should be noted that if switching would have been slower, an impression of flickering would have resulted. Accordingly, U.S. Pat. Nos. 5,002,387 to Baljet; 5,083,851 to MacDonald; and 5,245,319 to Kilian, provide examples of systems characterized by alternating eye 3D-glasses, alternating between left and right lens transmissiveness and synchronizing the left lens transmissiveness to left images and right lens transmissiveness to right images. Yet, these methods involve eyeglasses obligatorily worn by the viewer. This inherent obligation however is a primary disadvantage. Additional disadvantages of these systems include the complexity and thus expense of the shutter eyeglasses which must be connected to the display apparatus and simultaneously controlled, or alternatively (e.g. MacDonald) the increased complexity and expense of the display hardware itself. To avoid the use of complex eyeglasses U.S. Pat. No. 4,719,507 to Bos discloses an arrangement which allows use of passive polarizing filters in the eyeglasses, putting the more complex and high-voltage apparatus into the display device. U.S. Pat. No. 4,792,850 to Liptoh discloses a similar arrangement using circular light polarization. Nevertheless, these solutions have the disadvantage of making the entire screen appear and disappear to each eye during each cycle, which tends to increase the impression of flickering of the screen. As before, the principle disadvantage of the systems described by Bos and Liptoh is their dependence on eyeglasses worn by the viewer.

As far as the sixth category is of concern, side-by-side implementations such as for example random dot stereograms are essentially methods for utilizing parallax information, are difficult to see for many viewers, convey only simplified images, and cannot convey color. According to these methods a simple colorless image is combined with a complex background pattern, the background pattern substantially repeating itself at in interval less than the inter-pupillary distance of human observers, and the pattern being modified by the simplified image in such a way that elements of the simple image intended to be seen as being closer to the viewer cause corresponding areas of the repeating pattern of the complex background to be displaced towards each other. That is, if for example the background pattern would in large part repeat itself every inch, then an area representing a close object repeats itself at a distance of $19/20$ inch, and an area intended to appear further away repeats itself at a distance of $21/20$ inch. The viewer, often with some difficulty, views the stereogram by directing his right eye to some given area of the repeating pattern, and his left eye to an adjacent area of the repeating pattern, to the left of the point seen by the right eye. Since the patterns substantially repeat themselves, the viewer is (usually) able to coalesce the images. Thus the left eye is provided with a left image which is different (since it originates e.g. an inch away on the stereogram) from the right image. The eyes then have the ability to extract the information based on the consistent differences between the two images, and understand it in terms of the simplified scene which is in fact included in the stereogram only as modifications in the position of elements of the background pattern. Normal images have also been included in published stereograms, for example in the "Magic Eye" series of books published by Michael Joseph Ltd., London. In this case sets of normal full-color images with differing parallax information are included in the published image in such a way that they can be viewed by the viewer's directing his eyes in the same manner as he directs them for viewing a stereogram, namely by directing his right eye to a given image, and directing his left eye to a similar neighboring image which is physically next to the first, and differs from it in that it contains a different parallax view of the same scene.

As far as the seventh category is of concern flat screens for three-dimensional viewing are disclosed in several recent patents. These patents disclose systems in which grids consisting of transparent sections interspersed with opaque sections are placed in various relationships to the image being seen or projected, the image is an interspersed composition of regions taken from the left image (i.e., to be eventually seen only by the left eye of the viewer) and regions taken from the right image (i.e., to be eventually seen only by the right eye of the viewer), the grid or grids being placed in positions which hide regions of the right image from the left eye and hide regions of the left image from the right eye, while allowing each eye to see sections of the display which are showing regions originating from its appropriate image. For example, U.S. Pat. No. 4,671,632 to August, discloses a system for using a "line screen", August's system includes vertical blocking portions alternating with vertical transparent portions, and a second blocking screen parallel to the first line screen, also composed of blocking portions and transparent portions. However, August's embodiments (as described in FIGS. 11, 12, and 13 therein) suffer from a major drawback that large percentages of the field of view of each eye (well more than part, according to August's drawings) are hidden from the eye at any given time, yielding a grainy low-resolution image. U.S. Pat. No. 5,264,964 to Faris, discloses a method for creating a parallax barrier by placing pairs of small polarizing regions one immediately above the other and of opposite polarization orientation, thus creating opaque regions, and also describes an embodiment in which simple opaque regions are used in place of the pairs of polarizing regions. In both cases a barrier is created with transparent regions alternating with opaque regions, with size and spacing adjusted such that the left and right eyes looking through the transparent regions of the barrier each sees a different pixel on the display layer, thus creating the possibility for supplying each eye with elements of the left and right image which are appropriate to it. However, Faris' invention is limited to a fixed position of the viewer with respect to the display during the whole time of viewing. The images viewed in an eyeglassesless mode in accordance with Faris' invention are inevitably grainy, since they always include at least 50% of areas which have no image, corresponding to the areas in which each eye's vision is blocked by the opaque parts of the barrier. U.S. Pat. No. 5,146,246 to Marks, discloses a method in which a raster grid is used to block narrow strips of image from one eye and show them to the other eye, while distributing the images in such a way that portions of the right image are visible to the right eye and portions of the left image are visible to the left eye. This is basically a projection system using a diffusion screen between two raster structures alternating opaque and transparent sections, and as such, is similar to some of the embodiments described by Faris. It, however, shares the limitations noted above, i.e., a significant percentage of the field of view is occupied by opaque regions which do not transmit either image, thereby limiting the resolution of the visible image and producing graininess.

There is thus a widely recognized need for, and it would be highly advantageous to have, systems for three-dimensional viewing which can be used by a viewer to obtain a perception of depth while viewing still or motion pictures needless of use of eyeglasses, which systems devoid the above mentioned limitations.

DEFINITIONS OF TERMS

For the sake of clarity terms to be used herein in this document are defined as follows.

"Frame": a display or a part of a display to be three-dimensionally viewed.

"Left image": the image to be seen by the left eye of the viewer. In embodiments of the present invention used for producing the illusion of depth, this would correspond to the image seen by the left eye, captured for example by a camera playing the role of the left eye and placed near (typically to the left of) a second camera playing the role of the right eye, or to an image created by drawing, computer graphics, or other non-photographic means, which image contains parallax information appropriate to the left-hand position of a pair of images which, when viewed together and combined by the human perceptual system into a single image, give the illusion of depth. Note that this description is given for clarity only, and is not intended to limit the scope of the invention to the display of left and right images of any particular origin. The left image may be a still image, or one of a sequence of images displayed one after another to constitute a motion picture.

"Right image": the image intended to be seen by the right eye. The right image may be a still image, or one of a sequence of images displayed one after another to constitute a motion picture.

"3D-image": a three-dimensional image as viewed by a viewer according to any of the embodiments of the present invention.

"Display": a medium by which an image as defined hereinabove is initially presented. Suitable displays include but are not limited to display screens such as light-reflecting means in the form of a translucent screen, or light-emitting means such as a CRT screen or an LCD screen. The nature of the "display" as used herein is not limited to these examples, nor is the invention described herein limited to the use of any particular technology of display. In particular, the meaning of "display" is not limited to means traditionally used for displaying three-dimensional images and motion pictures. Thus, for example, outdoor advertising displays and pictures such as those printed on cards or in books or magazines, are all additional examples of "display" relevant to certain embodiments of the invention described hereinbelow.

"Polarizing means": this term includes any linear polarizing means which block light whose angle of vibration is in one direction (i.e., orientation) while passing light whose angle of vibration is in another direction. The term also includes means which convert linearly polarized light into circularly polarized light, means which convert circularly polarized light into linearly polarized light, and means which pass light which is circularly polarized in one sense but do not pass light which is circularly polarized in the other sense.

"Light-rotating means" are means which change by 90 degrees the orientation of linearly polarized light, or which change the sense of circularly polarized light converting right-handed polarized light into left-handed polarized light or left-handed polarized light into right-handed polarized light.

"Switchable light-rotating means" are light rotating means whose light-rotating effect can be turned on/off under electronic control, as under the Kerr effect. Thus light rotating means is defined 'on' when it rotates light and 'off' when it does not rotate light.

"Shutter means": this term is taken to include any means by which particular portions of a screen or layer of material can be made to be substantially transparent, and at other times can be made to be substantially opaque, under the control of switchable means. This might, for example, be accomplished by a unit of switchable light rotating means (as defined above) sandwiched between two layers of linear polarizing means, both layers oriented in a given same direction. Such an arrangement is opaque or transparent depending on whether the light rotating means is on or off. This example, however, is given for the sake of clarity, yet the nature of the "shutter means" as used herein is not limited to this example nor to any particular technology of shutter means. Thus a solid material having transparent holes which is translated relative to the image as defined hereinabove can also be used as suitable shutter means in some of the embodiments of the present invention.

"Eyeglasses": the term is used throughout in this document as a shorthand way of referring to any arrangement which provides for optical means which are physically close to the viewer's eyes, and particularly those which are such that most or all of the light emanating or reflected from the display and directed towards the left eye, enters optical means located in front of the left eye, before reaching it, whereas most or all of the light emanating or reflected from the display is and directed towards the right eye enters optical means located in front of the right eye before reaching it. Thus, eyeglasses as used herein includes the polarizing glasses and color-filter glasses traditional employed in the field of stereoscopy, yet the term also includes headsets, arrangements which place mirrors or lenses or prisms in close proximity with the eyes, and so forth.

"Viewer" is an individual facing and viewing the display.

An "appropriate image" for the viewer's left eye is the left image as defined above, whereas an "appropriate image" for the viewer's right eye is the right image as defined above. "Inappropriate images" are the right image with respect to the left eye and the left image with respect to the right eye. "Appropriate eye" and "inappropriate eye" are terms derived from the above description.

"Viewing stereoscopically" means in particular the viewing of pairs of left and right images containing appropriate parallax information, such that when the viewer views the images simultaneously or nearly simultaneously, and in the process of his viewing coalesces the two images into a single image gestalt in the manner well known in the art of stereoscopy, the result is a single perceived image giving the illusion of depth, as defined hereinabove a 3D-image. However, the term viewing stereoscopically as used herein is not limited to pairs of images containing such parallax information, it is intended to apply to any pair of images which can be so coalesced and give the viewer the impression of a single image containing information from two sources.

The present invention is couched in terms of linear light polarization. However, it is clear to one ordinarily skilled in the art that various aspects of the embodiments of the invention described hereinbelow can be effected using circular light polarization. Thus, for example, referring to embodiments of the invention wherein a light polarizing layer is placed close to a display, the layer may infact include a linear polarizing layer coupled with a quarter-wave light-retarding means, converting the linear polarized light into circular polarized light. Reference to light linearly polarized in a particular orientation can then be taken to refer to light circularly polarized in a particular sense (i.e., left-handedness or right-handedness). Referring to embodiments wherein an analyzing filter is positioned nearest to the eyes of a viewer, which analyzing filter is a linear light polarizing filter, the filter may infact further include a quarter-wave light retarding means which converts circularly polarized light into linearly polarized light. Alternatively, the linear light polarizing filter might be replaced by circular polarizing means which pass light with circular polarization in one particular sense (i.e., left-handedness or right-handedness) while absorbing, diffusing or reflecting light circularly polarized in the other sense. For embodiments in which on/off switchable light rotating means are employed for rotating the orientation of linearly polarized light, reference to those means also refers to on/off switchable light rotating means for changing the sense of circularly polarized light.

Thus, considering the uses of light polarization and polarization based filtering which are hereinafter described, the essential characteristics of the invention are unaffected by substitutions of the kind described above. Consequently, and for sake of simplicity, the embodiments of the present invention are hereinafter described in terms of linear light polarization, yet this description by no means is to be taken as limiting the scope of the invention to any particular method of light polarization. Thus when the term 'orientation' is used to describe the direction of light polarization herein in this document and especially in the claims below, it refers both to linear and circular light polarization.

SUMMARY OF THE INVENTION

According to the present invention there are provided systems for three-dimensional viewing which can be used by a viewer to obtain a perception of depth while viewing still or motion pictures, some of the systems do not require use of eyeglasses.

According to further features in preferred embodiments of the invention described below, provided is a first system for three-dimensional viewing of a display, the display presents a frame, the frame includes first subregions and second subregions distributed across and along the frame, the first subregions alternately present first and second picture elements of a left image and a right image, respectively, while at the same times, the second subregions alternately present corresponding second and corresponding first picture elements of the right image and the left image, respectively, the system comprising (a) a light polarizing layer including first subareas and second subareas, the first subareas polarizing light in a first orientation, the second subareas polarizing light in a second orientation, the first and second subareas being distributed across and along the light polarizing layer in an arrangement corresponding to the distribution of the first and second subregions, respectively, such that light emanating from the first and second subregions passes through the first and second subareas, respectively, such that light emanating from the first subregions after passing through the first subareas is polarized in the first orientation, whereas light emanating from the second subregions after passing through the second subareas is polarized in the second orientation, the light polarizing layer being located closest to the display; (b) a layer of on and off switchable light rotating means being between the light polarizing layer and a viewer, such that when the layer of light rotating means is on, light passing through it is rotated, whereas when the layer of light rotating means is off, light passing through it is not rotated; (c) eyeglasses including a left eyepiece and a right eyepiece, the left eyepiece allowing light polarized in the first orientation to reach the left eye of the viewer, substantially blocking light polarized in the second orientation from reaching the left eye of the viewer, the right eyepiece allowing light polarized in the second orientation to reach the right eye of the viewer, substantially blocking light polarized in the second orientation from reaching the right eye of the viewer; and (d) a coordinating switching means for alternately switching on and off the layer of switchable light rotating means, such that when the layer of switchable light rotating means is off, the first subregions present the first picture elements of the left image and the second subregions present the second picture elements of the right image, whereas when the layer of switchable light rotating means is on, the first subregions present the second picture elements of the right image and the second subregions present the first picture elements of the left image.

According to still further features in the described preferred embodiments the alternation of the first and the second picture elements between the first and the second subregions is in a rate, whereat due to the visual persistence of the human vision system, an illusion in which the left eye sees the left image and the right eye sees the right image substantially at all times, is formed.

According to still further features in the described preferred embodiments the distribution of the first and second subregions across and along the frame is selected from the group of distributions consisting of an arbitrary distribution and an alternating distribution.

According to further features in preferred embodiments of the invention described below, provided is a second system for three-dimensional viewing of a display, the display presents a frame divided into at least one left region presenting at least a part of a first image and at least one right region presenting at least a part of a second image, the system comprising a first and a second light polarizing layers each being divided into first subareas and second subareas, the first subareas polarizing light in a first orientation, the second subareas polarizing light in a second orientation, the first layer being closest to the display, the second layer being between the first layer and a viewer, the first and second layers being in a distance from one another and the first and second subareas being distributed across and along the first and second layers such that light emanating from the at least one left region reaches one of the eyes of the viewer and is substantially blocked from the other eye, whereas light emanating from the at least one right region reaches the other eye of the viewer and is substantially blocked from the first eye.

According to still further features in the described preferred embodiments the first image is either a left image or a right image and the second image is either a right image or a left image respectively.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising first mechanical means for translating the first and second light polarizing layers one relative to the other.

According to still further features in the described preferred embodiments the system further comprising second mechanical means for translating any of the first and second light polarizing layers relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a third system for three-dimensional viewing of a display, the display presents a frame divided into at least one left region and at least one right region, the system comprising (a) a first light polarizing layer being divided into first subareas and second subareas, at a first phase of operation the first subareas polarizing light in a first orientation and the second subareas polarizing light in a second orientation, whereas at a second phase of operation the first subareas polarizing light in the second orientation and the second subareas polarizing light in the first orientation, the first layer being closest to the display; (b) a second light polarizing layer being divided into third subareas and fourth subareas, the third subareas polarizing light in the first orientation and the fourth subareas polarizing light in the second orientation, the second layer being between the first layer and a viewer; (c) means for rapidly selecting between the first phase of operation and the second phase of operation, the first and second layers being in a distance from one another and the first, second, third and fourth subareas being distributed across and along the first and second layers, such that when the first phase of operation is selected, light emanating from the at least one left region reaches one of the eyes of the viewer and is substantially blocked from the other eye and light emanating from the at least one right region reaches the other eye of the viewer and is substantially blocked from the first eye, whereas when the second phase of operation is selected, light emanating from the at least one left region reaches the other eye of the viewer and is substantially blocked from the first eye and light emanating from the at least one right region reaches the first eye of the viewer and is substantially blocked from the other eye; and (d) a coordinating element coordinating between a rate of selecting the first and second phases of operation and between first and second parts of first and second images being presented on the regions of the frame, such that when the first phase of operation is selected, the first part of the first image is presented on the at least one left region and the second part of the second image is presented on the at least one right region of the frame, whereas when the second phase of operation is selected, the second part of the first image is presented on the at least one right region and the first part of the second image is presented on the at least one left region of the frame.

According to still further features in the described preferred embodiments the means for rapidly selecting between the first phase of operation and the second phase of operation are mechanical.

According to still further features in the described preferred embodiments the first image is a left image, the second image is a right image, the first parts are left parts and the second parts are right parts.

According to still further features in the described preferred embodiments the first image is a right image, the second image is a left image, the first parts are right parts and the second parts are left parts.

According to further features in preferred embodiments of the invention described below, provided is a fourth system for three-dimensional viewing of a display, the display presents a frame divided into at least one left region and at least one right region, the system comprising (a) a first and a second light polarizing layers each being divided into first subareas and second subareas, the first subareas polarizing light in a first orientation, the second subareas polarizing light in a second orientation, the first layer being closest to the display, the second layer being between the first layer and a viewer; (b) a layer of on and off switchable light rotating means being between the light polarizing layers, such that when the layer of light rotating means is on, light passing through it is rotated, whereas when the layer of light rotating means is off, light passing through it is not rotated, the first and second layers being in a distance from one another and the first and second subareas being distributed across and along the first and second layers, such that when the layer of switchable light rotating means is off, light emanating from the at least one left region reaches one of the eyes of the viewer and is substantially blocked from the other eye and light emanating from the at least one right region reaches the other eye of the viewer and is substantially blocked from the first eye, whereas when the layer of switchable light rotating means is on, light emanating from the at least one left region reaches the other eye of the viewer and is substantially blocked from the first eye and light emanating from the at least one right region reaches the first eye of the viewer and is substantially blocked from the other eye; and (c) a coordinating element for coordinating between rate of on and off switching of the layer of switchable light rotating means and between first and second parts of first and second images being presented on the regions of the frame, such that when the layer of switchable light rotating means is off, the first part of the first image is presented on the at least one left region and the second part of the second image is presented on the at least one right region, whereas when the layer of switchable light rotating means is on, the second part of the first image is presented on the at least one right region and the first part of the second image is presented on the at least one left region.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments the first image is a left image, the second image is a right image, the first parts are left parts and the second parts are right parts.

According to still further features in the described preferred embodiments the first image is a right image, the second image is a left image, the first parts are right parts and the second parts are left parts.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the first and second light polarizing layers one relative to the other.

According to still further features in the described preferred embodiments the further comprising mechanical means for translating any of the first and second light polarizing layers and the layer of on and off switchable light rotating means relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a fifth system for three-dimensional viewing of a display, the display alternately presents a left image and a right image, the system comprising (a) a first light polarizing layer being divided into first subareas and second subareas, at a first phase of operation the first subareas polarizing light in a first orientation and the second subareas polarizing light in a second orientation, whereas at a second phase of operation the first subareas polarizing light in the second orientation and the second subareas polarizing light in the first orientation, the first layer being closest to the display; (b) a second light polarizing layer being divided into third subareas and fourth subareas, the third subareas polarizing light in the first orientation and the fourth subareas polarizing light in the second orientation, the second layer being between the first layer and a viewer; (c) means for rapidly selecting between the first phase of operation and the second phase of operation, the first and second layers being in a distance from one another and the first, second, third and fourth subareas being distributed across and along the first and second layers, such that when the first phase of operation is selected, light emanating from the display reaches a first eye of the viewer and is substantially blocked from the second eye, whereas when the second phase of operation is selected, light emanating from the display reaches the second eye of the viewer and is substantially blocked from the first eye; and (d) a coordinating element coordinating between rates of selecting the first and second phases of operation and between alternately presenting the left and right images on the display, such that when the first phase of operation is selected the left image is presented on the display, whereas when the second phase of operation is selected the right image is presented on the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments the means for rapidly selecting between the first phase of operation and the second phase of operation are mechanical.

According to further features in preferred embodiments of the invention described below, provided is a sixth system for three-dimensional viewing of a display, the display alternately presents a left image and a right image, the system comprising (a) a first and a second light polarizing layers each being divided into first subareas and second subareas, the first subareas polarizing light in a first orientation, the second subareas polarizing light in a second orientation, the first layer being closest to the display, the second layer being between the first layer and a viewer; (b) a layer of on and off switchable light rotating means being between the light polarizing layers, such that when the layer of light rotating means is on, light passing through it is rotated, whereas when the layer of light rotating means is off, light passing through it is not rotated, the first and second layers being in a distance from one another and the first and second subareas being distributed across and along the first and second layers, such that when the layer of switchable light rotating means is off, light emanating from the display reaches a first eyes of the viewer and is substantially blocked from the second eye, whereas when the layer of switchable light rotating means is on, light emanating from the display reaches the second eye of the viewer and is substantially blocked from the first eye; and (c) a coordinating element for coordinating between rates of on and off switching of the layer of switchable light rotating means and between alternating the first and second images on the display, such that when the layer of switchable light rotating means is off, the left image is presented on the display, whereas when the layer of switchable light rotating means is on, the right image is presented on the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments each of the first and second light polarizing layers includes a light polarizing sublayer and a sublayer of multiple on and off switchable light rotating means, the system further comprising a multi-line controlling switching means, each of the multiple switchable light rotating means of each of the sublayers of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the first and second light polarizing layers one relative to the other.

According to still further features in the described preferred embodiments the system further comprising mechanical means for translating any of the first and second light polarizing layers and the a layer of on and off switchable light rotating means relative to the display.

According to still further features in the described preferred embodiments the system further comprising additional sublayers of multiple on and off switchable light rotating means being between the first and second light polarizing layers and being controlled by the multi-line controlling switching means.

According to still further features in the described preferred embodiments the system further comprising means for sensing the position and the distance of the viewer relative to the display.

According to further features in preferred embodiments of the invention described below, provided is a seventh system for three-dimensional viewing of a display, the display presents a frame, the frame includes first subregions and second subregions distributed across and along the frame, the first subregions alternately present first and second picture elements of a left image and a right image, respectively, while at the same times, the second subregions alternately present corresponding second and corresponding first picture elements of the right image and the left image, respectively, the system comprising (a) a layer of shutter means including alternating first and second subareas being arranged across and along the layer, wherein in a first phase of operation, the first subareas are substantially opaque and the second subareas are substantially transparent, whereas in a second phase of operation the first subareas are substantially transparent and the second subareas are substantially opaque, the layer of shutter means being in a distance from the display and the first and second subareas being distributed across and along the layer of shutter means, such that in the first phase of operation, light emanating from the first subregions reaches the one of the eyes of the viewer and is substantially blocked from the other eye and light emanating from the second subregions reaches the other eye of the viewer and is substantially blocked from the first eye, whereas in the second phase of operation, light emanating from the first subregions reaches the other eye of the viewer and is substantially blocked from the first eye and light emanating from the second subregions reaches the first eye of the viewer and is substantially blocked from the other eye; and (b) a coordinating element coordinating between rates of selecting the first and second phases of operation and between alternately presenting the first and second picture elements of the left and right images in the first and second subregions, such that when the first phase of operation is selected, the first picture elements are presented in the first subregions and the second picture elements are presented in the second regions, whereas when the second phase of operation is selected, the second picture elements are presented in the first subregions and the first picture elements are presented in the second regions.

According to still further features in the described preferred embodiments the layer of shutter means includes a first and a second light polarizing sublayers both polarize light in the same orientation, and a sublayer of alternating first and second on and off switchable light rotating means located between the first and second light polarizing sublayers, the first and second switchable light rotating means are under control of the coordinating element, such that when the first switchable light rotating means are on the second switchable light rotating means are off, and when the first switchable light rotating means are off the second switchable light rotating means are on.

According to still further features in the described preferred embodiments the layer of shutter means includes a first and a second light polarizing sublayers and a sublayer of multiple on and off switchable light rotating means located between the first and a second light polarizing sublayers, the system further comprising a multi-line controlling switching means, each of the multiple switchable light rotating means of each of the sublayer of multiple on and off switchable light rotating means being individually switched on and off by the multi-line controlling switching means, such that size of the first and second subareas is under control of the multi-line controlling switching means, such that the system is adjustable for accommodating various positions and distances of the viewer from the display.

According to still further features in the described preferred embodiments the system further comprising mechanical means for translating the layer of shutter means relative to the display.

According to still further features in the described preferred embodiments the system further comprising additional layers of shutter means being between the display and a viewer and being controlled by the multi-line controlling switching means.

According to still further features in the described preferred embodiments the system further comprising means for sensing the position and the distance of the viewer relative to the display.

According to still further features in the described preferred embodiments the light polarization is selected from the group consisting of linear light polarization wherein the first orientation is substantially perpendicular to the second orientation and circular light polarization wherein the first orientation is substantially opposite in sense to the second orientation.

According to still further features in the described preferred embodiments any of the second to seventh systems further comprising means for sensing the position and the distance of the viewer relative to the display.

The present invention successfully addresses the shortcomings of the presently known configurations by providing a flatscreen fullcolor stereoscopic vision without eyeglasses or other optical means engaged close to the eyes of the viewer. Furthermore, some of the systems for three-dimensional viewing according to the present invention do not restrict the viewer to specific position and distance relative to the display, which viewer is thus free to move his head while viewing the display. Yet furthermore, the more advanced systems of the present invention are highly suitable for three-dimensional viewing both for still and motion pictures, yet in contrast with prior art systems do not involve moving parts, some may even be installed on existing hardware such as computers and television sets.

BRIEF DESCRIPTION OF THE DRAWINGS

The invention herein described, by way of example only, with reference to the accompanying drawings, wherein:

FIG. 5 is a simplified perspective view of a system for three-dimensional viewing according to a third embodiment of the present invention, using polarizing eyeglasses, in which left and right images are distributed throughout the display;

FIG. 6 is a simplified cross-section view of a system for three-dimensional viewing according to a fourth embodiment of the present invention, wherein left and right images are placed as in the first embodiment, and stereoscopic vision is achieved without the use of eyeglasses;

FIG. 7 is a simplified cross-section view of a system for three-dimensional viewing according to a fifth embodiment of the present invention, the system including a switching mechanism for rapid alternation of parts of the display which are visible to each eye at any given time;

FIG. 8 depicts the operation of the system according to the fifth embodiment of the present invention during a phase in which the left eye sees the left side of the display and the right eye sees the right side of the display;

FIG. 9 depicts the operation of the system according to the fifth embodiment of the present invention during a phase in which the left eye sees the right side of the screen and the right eye sees the left side of the screen;

FIG. 10 repeats some of the information of FIG. 6, in a manner convenient for comparison with FIG. 11;

FIG. 11 depicts an example of an alternative arrangement of elements of the system according to the fifth embodiment of the present invention, such that the entire left image or the entire right image may be made visible at any given time to a selected right or left eye;

DESCRIPTION OF THE PREFERRED EMBODIMENTS

The present invention is of systems for three-dimensional viewing which can be used by a viewer to obtain a perception of depth while viewing still or motion pictures. Specifically, the present invention can be used to three-dimensionally view still or motion pictures without the use of eyeglasses.

The principles and operation of systems for three-dimensional viewing according to the present invention may be better understood with reference to the drawings and accompanying descriptions.

Figure 1:
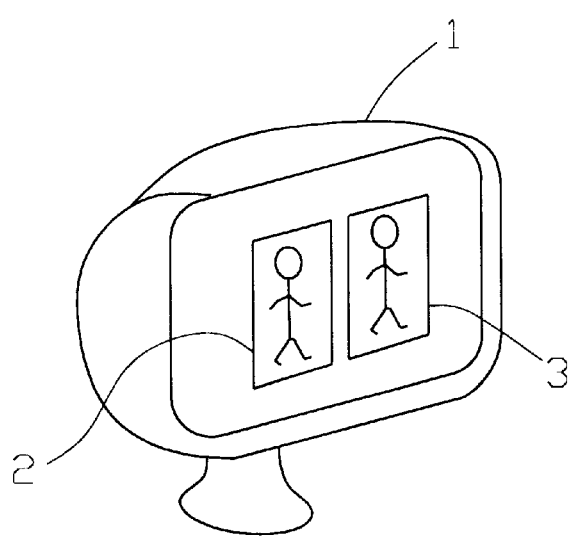
FIG. 1 depicts a manner of displaying left and right images on a display according to a first embodiment of the present invention.
Figure 2:
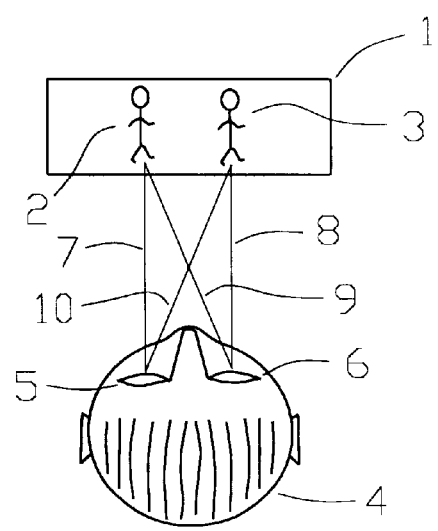
FIG. 2 depicts a manner in which a viewer directs his eyes towards the left and right images, according to the first embodiment of the present invention.
Figure 3:
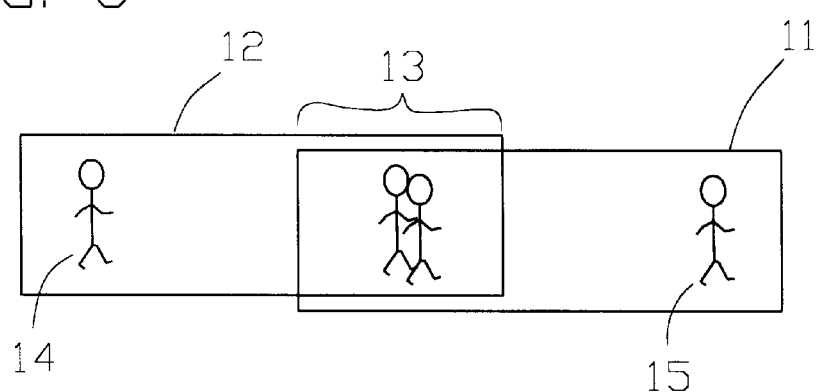
FIG. 3 depicts the manner in which the images are perceived, according to the first embodiment of the present invention.

Referring now to the drawings, FIGS. 1–3 illustrate a first embodiment of the present invention. According to the first embodiment of the invention, displayed (i.e., presented) is a stereoscopic movie made of frames of pairs of left and right images, which pairs of images, together, constitute stereoscopic views, by displaying (i.e., presenting) them side by side on a display, the pair of images size, placement, and surroundings are such that the viewer can view them stereoscopically by diverging the direction of his sight such that the viewer's right eye looks at the right image and the viewer's left eye looks at the left image.

FIG. 1 shows a display 1 displayed on a screen, which display 1 includes a displayed frame including a left image 2 to the left of a right image 3 as these terms are defined in the definition of terms section above. Left 2 and right 3 images are typically substantially identical in subject yet they differ in orientation, as would be the case, for example, if a pair of video cameras separated by approximately the human interpupillary distance (about 6.5 cm) were pointed at a single scene each from its slightly different perspectives, and the images thus generated were displayed (i.e., presented) as left 2 and right 3 images of FIG. 1, with left image 2 displayed on the left side of display 1. Please note however, as stated in the definitions section above, that this example and forthcoming examples of specific origins of images and/or specific techniques for displaying (i.e., presenting) them, are intended by way of clarification only and are not intended to limit the scope of the present invention to images or displays of any specific type.

The method of viewing a 3D-image according to the first embodiment of the present invention is illustrated in FIG. 2.

First, FIG. 2 shall be used to review the way a viewer 4 normally looks at an object. Viewer 4, when looking at an ordinary object, for example left image 2, in an ordinary manner, directs both his left eye 5 and his right eye 6 to image 2, resulting in line of sight 7 for left eye 5 and line of sight 9 for right eye 6. Similarly, when viewer 4 normally looks at image 3 the viewer directs both eyes 5 and 6 to that object, invoking lines of sight 10 for left eye 5 and 8 for right eye 6.

If image 2 is a left image as defined, and image 3 a right image, then a stereoscopic binocular (i.e., three-dimensional) view can be obtained by viewer 4 who diverges his eyes in such a way that left eye 5 is directed towards left image 2, resulting in line-of-sight 7, while at the same time right eye 6 is directed towards right image 3 resulting in line-of-sight 8.

Left 2 and right 3 images can then be coalesced by viewer 4 into a single image. If left 2 and right 3 images contain parallax information about a scene, a stereoscopic illusion of depth, in other words a 3D-image, results.

An alternative method of viewing is more comfortable for certain viewers. In this case left image 2 is displayed on the right side of display 1, whereas right image 3 is displayed on the left side. For perception of depth, viewer 4 crosses his eyes rather than diverging them, so that his left eye 5 looks at left image 3 along line of sight 10 and his right eye 6 looks at right image 2 along line of sight 9 (not shown).

In both cases, left eye 5 sees left image 2 and right eye 6 sees right image 3. Since left 2 and right 3 images are substantially similar in many respects, viewer 4, after suitable training in the practice, can coalesce images 2 and 3 into a single image with a central area in which both left 2 and right 3 images are seen together combined into a single image, a single gestalt. Surrounding left 2 and right 3 images by identical surroundings facilitates the process, but is not required. If images 2 and 3 are left and right images of substantially the same subject differing essentially only in the differences introduced by parallax information as defined above, viewer 4 will perceive the illusion of depth (i.e., three-dimensionality) resulting from binary stereo-optic viewing, with no additional optical equipment.

If an appropriate sequence of frames are displayed, each of which combines a left image displayed on one part of a display screen along with a right image displayed beside it on another part of the display screen, then three-dimensional movies can be seen by the viewer who directs his eyes in the manner described above.

Thus, according to the first embodiment of the present invention, perception of depth is obtained while displaying a series of frames each including a right and a left image, each pair of images is viewed in the manner described, the frames succeeding each other over time in a traditional manner of motion pictures, so as to produce a stereoscopic 3D-motion picture requiring no special optical apparatus beyond conventional means for displaying images (e.g., a television or a computer screen).

In certain publications, for example the "Magic Eye" series of books mentioned above, random-dot stereograms have been associated with sets of small normal still images printed across the page in such a manner that the viewer can view them, as he views the random dot stereograms, by directing his right eye to one particular image and his left eye to another particular image, usually the one to the left of the image viewed by the right eye. The images portray a same scene from slightly different perspectives, such that the user, when coalesces the images, perceives a combined image generating the illusion of depth.

So far, to the best of our knowledge, the use of a viewing method as described, applied to a series of frames creating a motion picture has not been previously contemplated nor implemented. It is interesting, however, to note that in U.S. Pat. No. 5,126,878 to Trumbull et al., the idea of displaying left and right images side by side on a display is in fact contemplated. However, Trumbull et al., does not relate to the possibility of such images being displayed in such a manner that they can be coalesced into a single image and viewed stereoscopically without benefit of further optical apparatus. Alternatively, Trumbull's disclosure concerns an apparatus worn in front of the eyes, which moves the images and changes their dimensions. Such an apparatus participates in the general disadvantage of all the solutions requiring special eyeware (i.e., eyeglasses) to be worn, and while it presents certain advantages in terms of the apparent size of the images displayed, it also presents clear disadvantages in terms of expense, simplicity, attractiveness and perhaps also of comfort.

Nevertheless, two disadvantages are inherent to the first embodiment of the present invention as described herein. The first disadvantage is that, if the images are to be viewed without eyeglasses, lenses, mirrors, or other optical equipment, best results are obtained if the eyes are not required to diverge beyond the angle natural for normal unaided viewing of distant objects, in which the lines of sight of the two eyes are essentially parallel to each other. Consequently, the width of images which can be successfully combined into a single gestalt in their entirety has as an approximate upper limit the interpupillary distance of the viewer, typically less than 7 cm for each image.

The second disadvantage of the first embodiment is that each eye, in addition to seeing the image appropriate for it, also has a peripheral view of the image not appropriate to it. Thus, in the usual implementation of the first embodiment, with the left eye looking at the left image placed on the left side of the screen and the right eye looking at the right image placed on the right side of the screen, the left eye, while looking at the left image, also sees on the periphery the right image located to the right of the left image, and the right eye looking at the right image also sees on the periphery the left image located to the left of the right image. Referring again to FIG. 2, this means that viewer 4 while looking with his left eye 5 at left image 2 along line of sight 7, will also see, "out of the corner of his eye" (i.e., peripherally), right image 3 located to the right of left image 2 towards which left eye 5 is directed. Similarly, as viewer's 4 right eye 6 looks at right image 3 along line of sight 8, viewer 4 will also peripherally perceive left image 2 located to the left of right image 3 which is viewed right eye 6.

With reference now to FIG. 3, the above described situation is demonstrated. Assuming that the left image is on the left side of the display, box 12 represents the scene as perceived by the left eye, whereas box 11 represents the scene as perceived by the right eye. Central region 13 of FIG. 3 is the area on which both eyes are focused, and the images at central region 13 are coalesced into a single gestalt. (For clarity, the image from the left eye is displaced slightly to the left and upwards, hence the central region 13 shows a double image. In actual perception, the images are coalesced by the viewer, and the central region 13 appears as a single image (gestalt), and, if the left and right images are suitably chosen, that single image has the illusion of depth.

The disadvantage mentioned above lies in the fact that the entire scene perceived by the viewer resembles the entire drawing of FIG. 3, rather than only central region 13 of FIG. 3. When the viewer combines the two appropriate images into a single stereoscopic image (gestalt) in central region 13 of the viewer's field of view, two additional flanking images 14 and 15 appear, one to each side of central region 13. These can be largely ignored by experienced viewers, but they tend to be distracting and make it difficult for some viewers to resolve the two appropriate images into a single stereo-optical image.

Thus, the following embodiments of the invention are directed at systems in which each of the viewer's eyes views only it's appropriate image, that is the left eye views a left image and the right eye views a right image.

Figure 4:
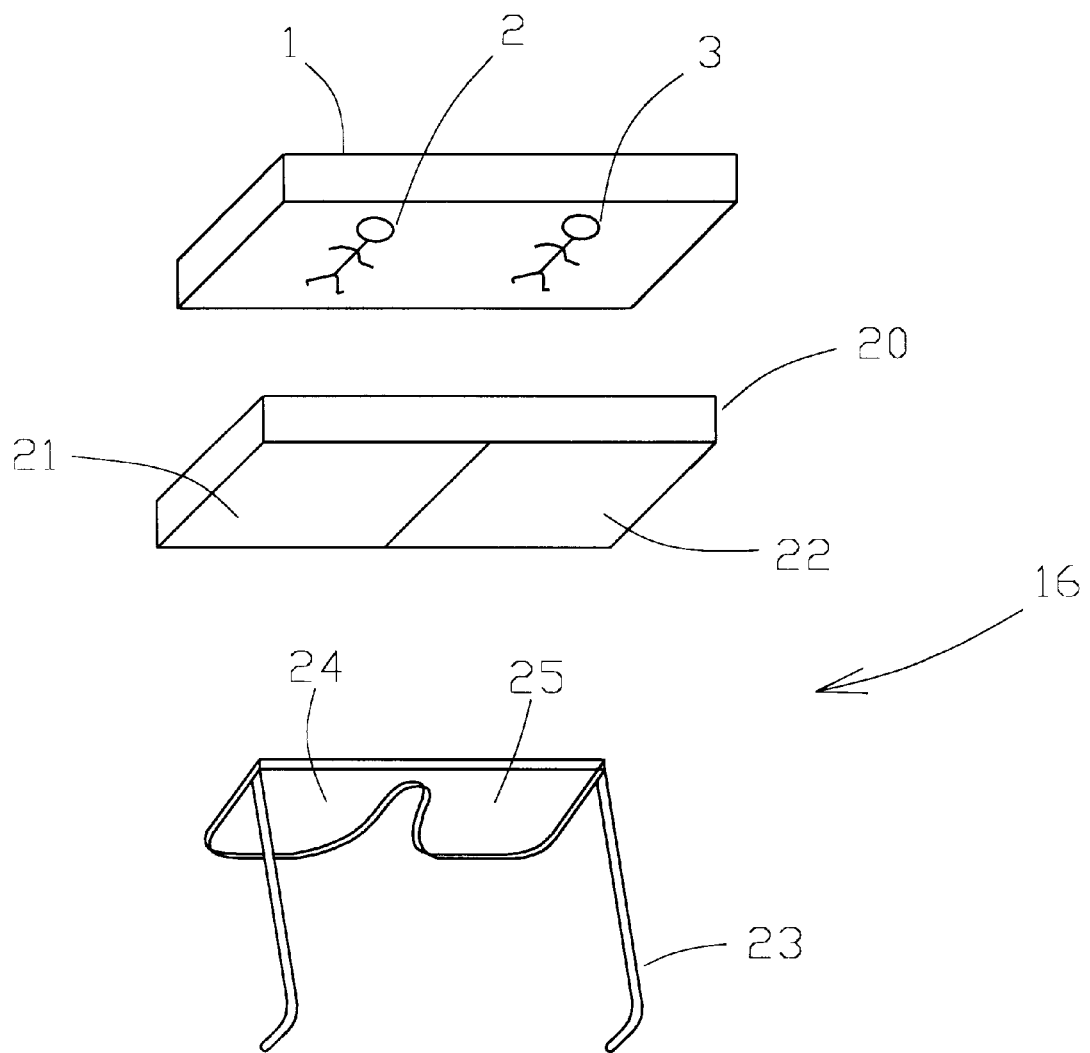
FIG. 4 is a simplified perspective view of a system for three-dimensional viewing according to a second embodiment of the present invention, using polarizing eyeglasses and images placed on the display as in the first embodiment, as depicted in FIGS. 1–3.

With reference now to FIG. 4, presented is a second embodiment of the present invention, aimed at solving the problem of flanking (i.e., peripheral) images as described above. FIG. 4 shows a system 16 for three-dimensional viewing. System 16 includes a layer 20, layer 20 includes light polarizing means and is divided into a first area 21 and a second area 22, area 21 substantially covering left image 2, whereas area 22 substantially covering right image 3, both images displayed on display 1. It should be noted that in intent, layer 20 is close to display 1, yet it has been moved disproportionally far away in the drawing for clarity in showing the placement of images on display 1. Area 21 polarizes light in a first orientation, whereas area 22 polarizes light in a second orientation, which is substantially perpendicular to the first. The viewer then wears polarizing eyeglasses 23 whose left eyepiece 24 allows only light polarized in the first orientation to enter the left eye, and whose right eyepiece 25 allows only light polarized in the second orientation to enter the right eye.

This solution is thus similar to the classical solution well known in the art of stereoscopy, whereby polarizing glasses are used to allow a left image polarized in one orientation to enter the left eye, and a right image polarized in a different orientation to enter the right eye, while preventing both eyes from seeing the inappropriate images. This technology has typically been used with the left and right images both distributed throughout the display, for example projecting two independent images, each polarized in a different orientation, onto a common display screen, e.g., 3D-movies are typically projected in this manner.

Note that is the present second embodiment and in embodiments to follow, a particular modification is called for in a case where the display is an LCD screen, since light emanating from a standard LCD is already polarized. In such a case, as demonstrated for the second embodiment of the invention, layer 20 would include light rotating means rather than light polarizing means such that area 21 would have no optical effect, consequently passing polarized light emanating from the LCD screen and having the first orientation, whereas area 22 would have a light rotating effect, and would thus 90 degrees rotate the polarized light emanating from the LCD screen giving it the second orientation.

The advantage of the present second embodiment, where the left image and the right image are placed as described in FIGS. 1–4, is found in the fact that very simple and inexpensive means can be used to create a situation where light emanating from the two images is polarized differently, allowing three-dimensional displays using this methodology to be constructed more simply and less expensively than using other methodologies know to the art of stereoscopy. The images are limited in width, but otherwise enjoy the fill color and full resolution of the available display. An additional advantage of this embodiment lies in the fact that, if presented as a combination of light polarizing means layer 20 and eyeglasses 23, together with images provided as described, it can be applied to existing displays (e.g., standard televisions and computer display screens, printed material, etc.) in an extremely inexpensive manner, and requires no addition to nor modification of existing hardware.

With reference now to FIG. 5, presented is a third embodiment of the present invention. According to the third embodiment provided is another system 35 for three-dimensional viewing, system 35 enables to use images which are not limited in width, and which do not require special divergence or convergence of the eyes for them to be three-dimensionally viewed.

As mentioned above, U.S. Pat. No. 5,050,961 to Venolia discloses a system which supplies appropriate subregions of left and right images to the appropriate eyes, yet leaves 50% of the display area unseen by each of the eyes, thus affecting the quality (i.e., resolution) of the perceived 3D-image. On the other extreme, U.S. Pat. No. 5,083,851 to MacDonald provides means for using all image information of the display area for both left and right images, yet MacDonald means is relatively expensive and complex compared to the system 35 presented in FIG. 5 and described hereinbelow.

System 35 includes a display 1, a light polarizing layer 39 similar in function to layer 20 of FIG. 4, polarizing eyeglasses 23 which are similar to those described for the previous second embodiment, and a layer 49 which includes an on/off switchable element of light-rotating means, providing what is known in the art as the Kerr effect.

The left and right images are distributed in a frame 22 throughout display 1 in arbitrarily small first 31 and second 32 subregions (shown as alternating black 31 and white 32 picture elements in frame 22). Each of picture elements 31 and 32 can be as small as an individual pixel of a computer-driven raster display, or an alternate scan line of a television display. Utilization system 35 for three-dimensional viewing would typically involve very small subregions, nevertheless, their size has been exaggerated in FIG. 5 for sake of clarity. Furthermore, layers 39 and 49 are drawn far from display 1 and from one another for sake of clarity, yet layers 39 and 49 are typically much closer (e.g., adjacent) to one another and to display 1.

As further shown in FIG. 5, layer 39 of system 35 is divided into small first and second subareas 41 and 42 yielding an arrangement, such that light from each of subregions 31 and 32 of frame 22 passes through subareas 41 (marked with X in FIG. 5) and 42 of polarizing layer 39, respectively. Subareas 41 of light polarizing layer 39 which are traversed by light emanating from subregions 31 of frame 22 polarize that light in a first orientation, whereas subareas 42 of light polarizing layer 39 which are traversed by light emanating from subregions 32 of frame 22 polarize that light in a second orientation, which is substantially perpendicular to the first orientation. Thus in the example of FIG. 5, subareas 41 polarize light from subregions 31 of the left image in the first orientation, whereas subareas 42 polarize light from subregions 32 of the right image in the second orientation.

As in FIG. 4, left eyepiece 24 of eyeglasses 23 allows only light polarized in the first orientation to reach the left eye of the viewer, and right eyepiece 25 allows substantially only light polarized in the second orientation to reach the right eye of the viewer. Thus, each eye sees only its appropriate image.

If the light thus treated is to pass directly to eyeglasses 23, then one would have a system which would allow full-color stereographic viewing with no need for specially divergent or convergent vision, and which could occupy the entire width of the display, but which would be similar in essence to that described by Vanolia, and share with it the grainy image resulting from the fact that part the display is permanently blocked from sight of each of the eyes.

To overcome this problem, additional layer 49 is employed in system 35. As mentioned above, layer 49 includes an on/off switchable element of light-rotating means providing what is known in the art as the Kerr effect. Thus, switching layer 49 on (i.e., activated), according to the Kerr effect, changes by 90 degrees the orientation of polarization of light emanating from all subareas 41 and 42 of polarizing layer 39. As a result, light from subregions 31 which was previously hidden from the right eye will now become visible to the right eye, whereas light from subregions 32 which was previously hidden from the left eye will become visible to the left eye, and no light will reach an eye for which it was not intended. On the other hand, having layer 49 switched off (i.e., inactivated) has no such effect.

Further according to the third embodiment of the present invention, when light-rotating means layer 49 is inactivated, display 1 displays (i.e., presents) the left image in its original set of subregions 31, whereas the right image is accordingly displayed in its original set of subregions 32. On the other hand, when light-rotating means layer 49 is activated, the left image is displayed in subregions 32 and the right image is accordingly displayed in subregions 31.

As is apparent to one ordinarily skilled in the art and as mentioned above, the picture elements of frame 22, or as referred herein as subregions 31 and 32 have no particular necessary structure. Thus, the picture elements may be pixels, scan lines, or any other size or shape which is convenient in terms of production of the equipment and production of the images, and which reduces any sensation of flickering of the image as perceived by the viewer.

Further according to the third embodiment of the present invention and as further shown in FIG. 5, a coordinating switching means 51 is employed to ensure that on/off switching of light-rotating layer 49 as described above, coincides with the change in the distribution of the left and right image picture elements on the display. It will be appreciated by one ordinarily skilled in the art that switching means 51 may be connected with command lines 33 and 34 both to display 1 and to light-rotating layer 49, yet to the extent that the information required for switching means 51 to appropriately operate is available independently, command line connection 33 to display 1 is not obligatory and not required. This would be the case if, for example, the scanning frequency of display 1 were dependent on the frequency of the main current, or on a signal available from the display's input data stream and coordinating switching means 51 is similarly dependent. In these cases system 35, as described in FIG. 5, would not require command line 33 and might be manufactured independently of display 1. The system is thus provided, for example, together with sets of 3D-video tapes, and could then be used together with any standard television.

With reference now to FIG. 6, presented is a fourth embodiment of the present invention. The fourth embodiment provides yet another system 50 for three-dimensional viewing, system 50 provides an alternative method for eliminating the peripheral (i.e., flanking) 'extra' images 14 and 15 of FIG. 3, as described earlier for the first embodiment of the present invention. A profound advantage of system 50 of the fourth embodiment as compared for example with systems 16 and 35 described above is that system 50 does not require eyeglasses to be worn by the viewer to obtain a perception of depth (i.e., three-dimensionality).

As shown in FIG. 6, system 50 includes a display 1 which includes a frame 22 divided into at least one left region 52 where at least a part of a first image (i.e., all the first image or a picture element derived from the first image) is displayed and a at least one right region 53 where at least a part of a second image (i.e., all the second image or a picture element derived from the second image) is displayed. Preferably the first image is a left image and the second image is a right image, yet, as explained in the discussion of FIG. 2 above and as will be appreciated from the following description, it is also possible to inverse the placement of the left and right images. Points 54 and 55 represents the position of the viewer's left and right eyes, respectively.

System 50 further includes first and second layers 56 and 57, respectively, interposed between the viewer and display 1. Layer 57, which for sake of clarity appears somewhat distanced from display 1, can in fact be very close (e.g., adjacent) to display 1. Each of layers 56 and 57 is divided into subareas (arranged in strips of which a cross section is shown in FIG. 6) of two types, marked in FIG. 6 as dark 58 and light 59 subareas. Subareas 58 polarize light in a first orientation, whereas subareas 59 polarize light in a second orientation which is substantially perpendicular to the first orientation. Note that light emanating from equivalent zones (e.g., zones 61a and 61b of the right and left images, respectively) are polarized at perpendicular orientations as dictated by the arrangement of subareas 58 and 59 across layer 57.

Layer 56 includes alternating arrangement of subareas 58 and 59. Thus, positioning at a suitable close distance from display 1, and positioning layer 56 at a suitable distance 62 from layer 57, which distance 62 is dictated by the interpupillary distance 64 of the viewer, the distance between the viewer and layer 57, and the size of the subareas 58 and 59 into which layer 57 has been divided, ensures that left eye 54 views substantially only the left image and that right eye 55 views substantially only the right image and that a perception of depth (i.e., three-dimensionality) is obtained.

Thus, it is possible to choose a position for layer 56 at which subareas 58 and 59 of layer 56 which intercept (and transmit) light from corresponding subareas 58 and 59 of layer 57 in the direction of the appropriate eye, will also intercept (and block) light from subareas 58 and 59 contiguous to the corresponding regions of layer 57, when that light is aimed at the inappropriate eye.

Consider for example light emanating from zone 61b of left region 52 displaying the left image, as compared with light emanating from corresponding zone 61a of right region 53 displaying the right image. Due to the arrangement of subareas 58 and 59 across layer 57, upon passing through layer 57, the light emanating from zone 61b is polarized in the first orientation whereas the light emanating from zone 61a is polarized in the second orientation. Therefore and due to the alternate arrangement of subareas 58 and 59 across layer 56, and the position of layer 56 relative to layer 57 and the viewer as explained above, upon passing through layer 56, the light emanating from zone 61b and directed towards right eye 55 is blocked, and the light emanating from zone 61b and directed towards left eye 54 is transmitted, whereas the light emanating from zone 61a and directed towards left eye 54 is blocked, and the light emanating from zone 61a and directed towards right eye 55 is transmitted, thus each of eyes 54 and 55 views only the zone appropriate to it. As shown in FIG. 6, this description is valid for all other zones and corresponding zones of left and right images, respectively, thus, each of eyes 54 and 55 views only the zone appropriate to it and a perception of depth is obtained.

It will be appreciated to one ordinarily skilled in the art that more than one suitable distance 62 exists for layer 56. For example, layer 56 may be positioned along dashed line 65, yet it will be further appreciated that changing the distance also requires changing the size of subareas 58 and 59 across layer 56. Presently it is preferred to position layer 56 as close as possible to layer 57, thus rendering system 50 as thin as possible.

It will be Further appreciated by one ordinarily skilled in the art that the example provided in FIG. 6 is by way of explanation only, and that the scope of the fourth embodiment of the present invention described herein is not limited to the specific details provided by way of illustration. In particular, (i) layers 56 and 57 need not necessarily be flat orientations; (ii) the subareas need not necessarily be rectangular strips; the left and right images may be divided into a plurality of subareas of arbitrarily small size, each area being related to one or more regions of first layer 57 in the manner in which regions 52 and 53 relates to it; and (iii) the sizes of the subareas of layers 57 and 56 need not necessarily be equal throughout each layer, more than two polarizing layers subdivided into subareas may be used, and the polarizing capabilities of each subarea need not necessarily fill the subarea. Thus, it may be convenient or even necessary for some applications to leave 'free' non-polarizing areas around the polarizing areas 58 and 59 of layers 56 and 57, to prevent too great limitations on the viewer's head movement, and then compensate for this by using more than two layers (e.g., three layers).

The use of the fourth embodiment described hereinabove is now compared with the first embodiment described in FIGS. 1 and 2. It will be appreciated that in the fourth embodiment, as in the first embodiment, each of the viewer's eyes sees it's appropriate image, and does not see the inappropriate image. The left image is displayed as a whole unified image on the left side of the screen and the right image is displayed as a whole unified image on the right side of the screen, and the user, as in the first embodiment, combines the images by diverging his eyes such that the left eye looks at the left image and the right eye looks at the right image. In the current fourth embodiment, however, as differentiated from the first embodiment, there are no accompanying peripheral images because the right eye is blocked from seeing the left image and the left eye is blocked from seeing the right image. This improvement greatly facilitates the process by which the user fuses the two appropriate images into a single apparent 3D-image, viewed stereoscopically and capable of giving the illusion of depth. This stereoscopic viewing of the images is accomplished without eyeglasses or lenses, and the system required is relatively simple and inexpensive to make, has no necessary electronic components, and can easily be adapted to operate with existing hardware.

Nevertheless, the fourth embodiment hereinabove described shares one of the limitations mentioned in the discussion of the first embodiment, namely that there is a practical maximum to the width of image which can comfortably be displayed in this manner. This is due to the fact that the images are placed side by side on the display, and there are limits to the degree to which the viewer's eyes (in the absence of lenses, mirrors, or other optical aids) can comfortably converge or diverge in order to allow the left eye to point towards the left image and the right eye to point towards the right image.

With reference now to FIGS. 7–12, presented is a fifth embodiment of the present invention. According to the fifth embodiment of the invention provided is still another system 70 for three-dimensional viewing. System 70 does not have the limitation of a practical maximum width as described hereinabove for the first and fourth embodiments.

System 70 is similar to system 50 of the fourth embodiment, with the difference that at least some of the elements of polarization, represented above by layers 56 and 57 of FIG. 6, are switchable under electronic control or otherwise, e.g., mechanical control. That is, system 70 is constructed in such a manner that the orientation of polarization of certain elements can be either electronically or mechanically altered rapidly. The following examples of system 70 all concern switching the polarization effect of elements of polarization by electronic control, yet, as will be appreciated by one ordinarily skilled in the art switching of elements of polarization, although perhaps more complicated mechanical means, would, as briefly described in the summary of the invention, yield similar results.

FIGS. 7–9 illustrate a first configuration of system 70, yet it should be understood that the example of FIGS. 7–9 is provided by way of illustration, and the scope of the invention is not limited to any particular method of switching polarization. Thus, system 70 includes a display 1 displaying a frame 22, and first and second light polarizing layers 56 and 57. The width of layer 57, and the distance between layer 57 and display 1, as shown in FIGS. 7–9, have been exaggerated for sake of clarity.

Next to the layer 57, between layer 57 and layer 56, an on/off switchable light-rotating means in the form of layer 80 has been added, which layer 80 provides what is known in the art as the Kerr effect. Thus, layer 80 is capable of changing the orientation of polarization of light passing through it by 90 degrees, and can be switched on/off under control of a switching element 82, in turn controlled by a coordinating element 83. If the light-rotating activity of layer 80 is inactivated, the layer has no effect and system 70 operates similar to system 50 described above, except for a change in the image content of the regions 52 and 53, to be described shortly. If, on the other hand, the light-rotating activity of layer 80 is activated, then the orientation of polarization of light emanating from display 1, passing through each of the subareas 58 and 59 of layer 57, and then passing through activated layer 80, is subsequently perpendicular to what it is when layer 80 is inactivated. Thus, light previously polarized in the first orientation is now polarized in the second orientation, and light previously polarized in the second orientation is now polarized in the first orientation.

As a result, when layer 80 is activated, the effect of layer 56 upon the light reaching it is the exact opposite of that described in the preceding section. Light from left region 52 is prevented from reaching left eye 54, but allowed to reach right eye 55, and light from right region 53 is prevented from reaching right eye 55 but allowed to reach left eye 54.

Further according to the fifth embodiment of the present invention, the left and right images are used in the manner depicted in FIGS. 8 and 9, which describe alternate states of system 70. In general, each of the images is displayed on the entire width of display 1, but only part of each image is displayed at any given time. FIG. 8 shows the distribution when layer 80 is inactive. In this case left region 52 of display 1 is visible to left eye 54, and right region 53 of display 1 is visible to right eye 55. During this phase, and under the control of coordinating element 83 (shown in FIG. 7) display 1 displays (i.e., presents), in left region 52, a first (e.g., left) part of a first (e.g., left) image, marked as 81 in FIG. 8, and also displays (i.e., presents), in right region 53, a second (e.g., right) part of a second (e.g., right) image, marked as 82 in FIG. 8. The left eye 54 sees the left part of its appropriate image on the left part of the screen as indicated by field of view marked 83, and the right eye sees the right part of its appropriate image on the right part of the screen as indicated by field of view marked 84.

As shown in FIG. 9, during a second phase, which second phase is initiated and controlled by coordinating element 83, layer 80 is activated, the polarization of the light arriving at layer 56 is changed in 90 degrees, and the fields of view are the opposite of what they were in the previous phase described in FIG. 8. Thus, as indicated by field of view marked 87 in FIG. 9, left eye 54 now sees right region 53 located on the right-hand side of display 1, whereas, as indicated by field of view marked 88, right eye 55 now sees left region 52 located on the left-hand side of display 1. At the same time, display 1 displays (i.e., presents) the right part of left image 86 in right region 53, and the left part of the right image 85 in left region 52.

It will however be appreciated to one ordinarily skilled in the art that display 1 of system 70 may simultaneously present additional sets of right and left regions as these regions are depicted in FIGS. 7–9.

Thus, the left eye sees the left part of its appropriate image, on the left side of the display, during the first phase, and the right side of its appropriate image, on the right side of the display screen, during the second phase, whereas the right eye sees the right side of its appropriate image on the right side of the screen during the first phase, and the left side of its appropriate image on the left side of the screen during the second phase. Neither eye sees any part of the image not appropriate to it at any given time. When the switching speed is sufficiently fast, e.g., >20, preferably >30, more preferably >40, most preferably >60 switches per second, and the light intensity provided by the display is sufficiently strong, the visual persistence of the human vision system creates the illusion that each eye sees its full image all the time.

Hence, system 70 provides the user with full-screen full color stereoscopic viewing from an apparently flat screen, without need of special diverging or converging of the eyes to coalesce the left image and right image into a single stereoscopic image, and without necessitating the use of eyeglasses of any kind, which right and left images are not limited by a maximal comfortable to view width.

It should again be noted that the details of the example provided are illustrative only, and not intended to limit the scope of the invention herein described. In particular, using combinations of the methods presented in the above embodiments, the objectives described in the preceding paragraph can be obtained under a variety of different schemes for distributing parts of the left and right images over the display during two or more phases.

For example, FIGS. 10 and 11 illustrate a second configuration of system 70, which second configuration involves a simple change in the distribution of polarization orientations, with the effect of causing the entire screen of the display to be visible to left eye 54 when light-rotating layer 80 is inactivated, and the entire screen to be visible to right eye 55 when light-rotating layer 80 is activated. FIG. 10 is a reproduction of FIG. 6, simplified to facilitate comparisons, to which reproduction switching rotating layer 80 has been added. FIG. 10 shows an arrangement of subareas 58 and 59 providing different orientations of polarization. FIG. 11 is almost identical to FIG. 10, but the arrangement of certain subareas, those under region marked 67 have been switched. Thus, when layer 80 is inactivated, polarizing subareas 58 and 59 of layers 56 and 57 have the effect of making all of the display visible to left eye 54 and blocked from the vision of right eye 55, whereas activating layer 80 has the effect of reversing the activity of layer 56, thereby making the entire display visible to right eye 55 and blocked from the view of left eye 54. This particular arrangement of polarizing subareas 58 and 59 across layer 57 may be of advantage, for example, for use when display 1 is derived from a television, since it would presumably be simpler to alternate between the left and right images than it would be to create composite frames in which each scan line is partly derived from the left image and partly derived from the right image.

Figure 12:
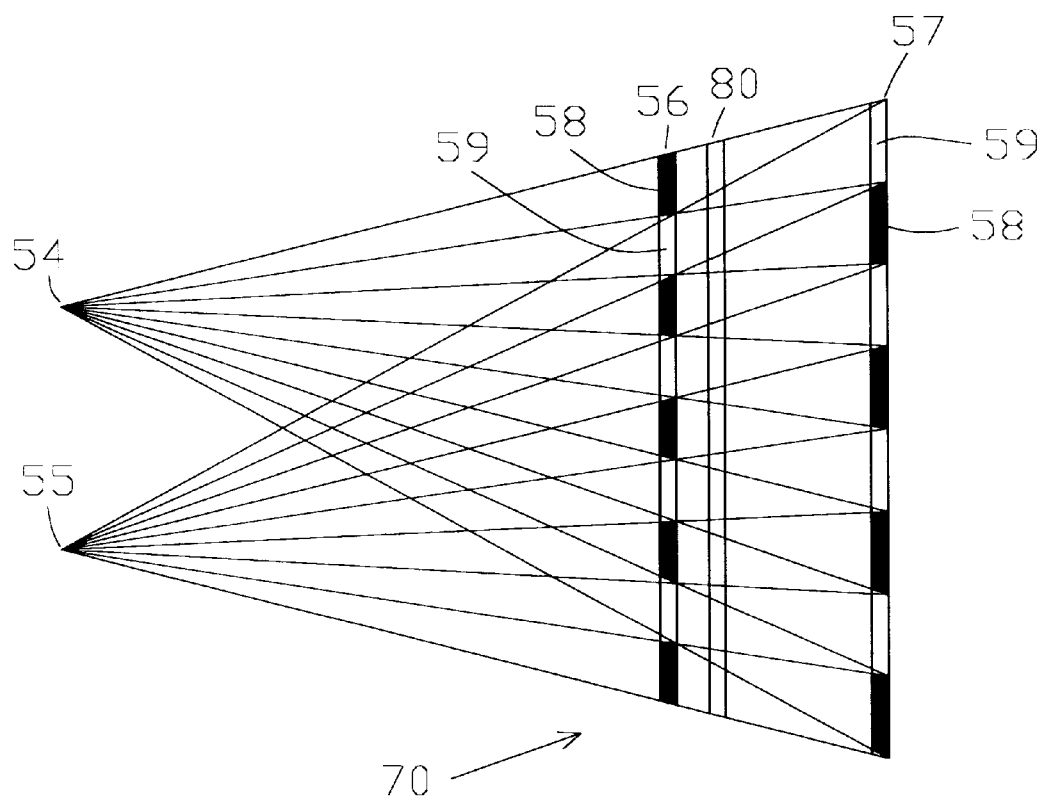
FIG. 12 depicts another example of alternative arrangement of elements of the system according to the fifth embodiment of the present invention.

Yet another example of arranging subareas 58 and 59 is shown in FIG. 12. It is possible to divide the polarizing strips (subareas 58 and 59) in the vertical direction as well. One such division might provide for first level of each strip to have polarization orientations as described in FIG. 11, a second level to have orientations as depicted in FIG. 12, where each of the subareas of layer 57 have orientations opposite to those of FIG. 11. The third, fifth, seventh, etc. levels (not shown) are oriented as the first, and the fourth, sixth, eight, etc. levels (not shown) are oriented as the second. The depth of each level could be that of a single scan line or a single pixel, or any multiplicity thereof which is convenient. Depending on the display used, this distribution scheme is likely to make it easier to produce a display which appears free of flickering, as compared to schemes in which the entire image, or large areas of the image, appear and disappear from a given eye simultaneously. Under this scheme, neighboring pixels or scan lines would appear and disappear as system 70 cycles between phases, and each eye would have an image, grainy but showing the complete image gestalt, present to it at all times, with only a very slight shifting of detail distinguishing the phases from each other.

It should be noted that (i) the sizes of the subareas of layers 57 and 56 need not necessarily be equal throughout each layer; (ii) more than two polarizing layers subdivided into subareas may be used; and (iii) the polarizing capabilities of each subarea need not necessarily fill the entire subarea. Thus, it may be convenient or even necessary for some applications to leave 'free' non-polarizing zones around polarizing subareas 58 and 59 of layers 56 and 57, to prevent too great limitations on head movement, and then compensate for this by using more than two layers (e.g., three layers).

It may be noted that the scheme for distribution of subareas described in the preceding paragraphs is suitable for use in certain contexts even without the presence of switchable light-rotating layer 80. For example, using system 50 as presented in FIG. 6, it is possible to distribute the left image and the right image, in a checkerboard pattern of alternating pixels throughout the width and height of the display. Alternatively, slightly larger areas of the images might be grouped, creating a display less sensitive to small movements of the viewer's eyes with respect to the display. The result, in either case, would be a display which is relatively grainy when compared to the relatively smooth and more detailed display made possible, as described, through the use of layer 80, yet it would nevertheless provide full-screen full-color stereoscopic viewing without eyeglasses, which does not require special diverging or converging of the eyes in order to coalesce the left and right images into a single image, and which has the additional advantages of being relatively inexpensive and requiring no electronic hardware, and of being compatible for use with static images such as printed material (e.g., books and magazines) or for use as a physical add-on to existing hardware devices, making the standard hardware able to use appropriate sources of stereoscopic computer programs, video tapes, television programs, etc.

Figure 13:
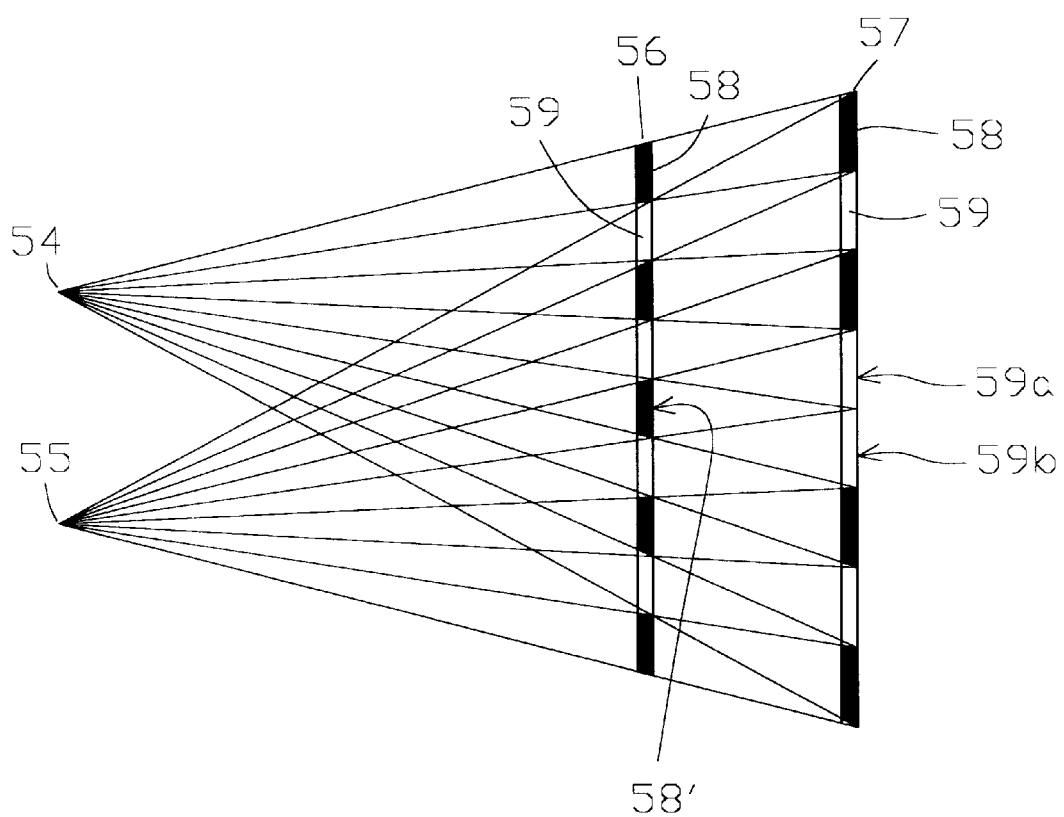
FIG. 13 depicts part of the information of FIG. 6, demonstrating the use of an opaque subarea.
Figure 14:
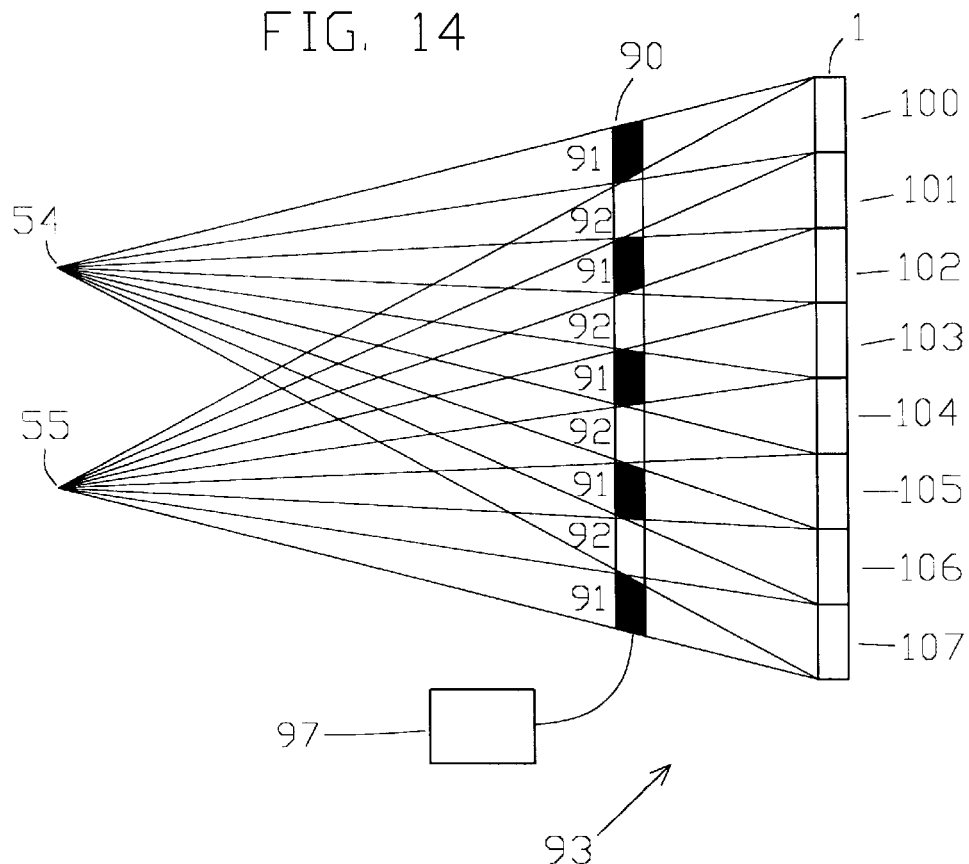
FIG. 14 is a simplified cross-section view of a system for three-dimensional viewing according to a sixth embodiment of the present invention having a switching shutter layer, in a first phase of operation.
Figure 15:
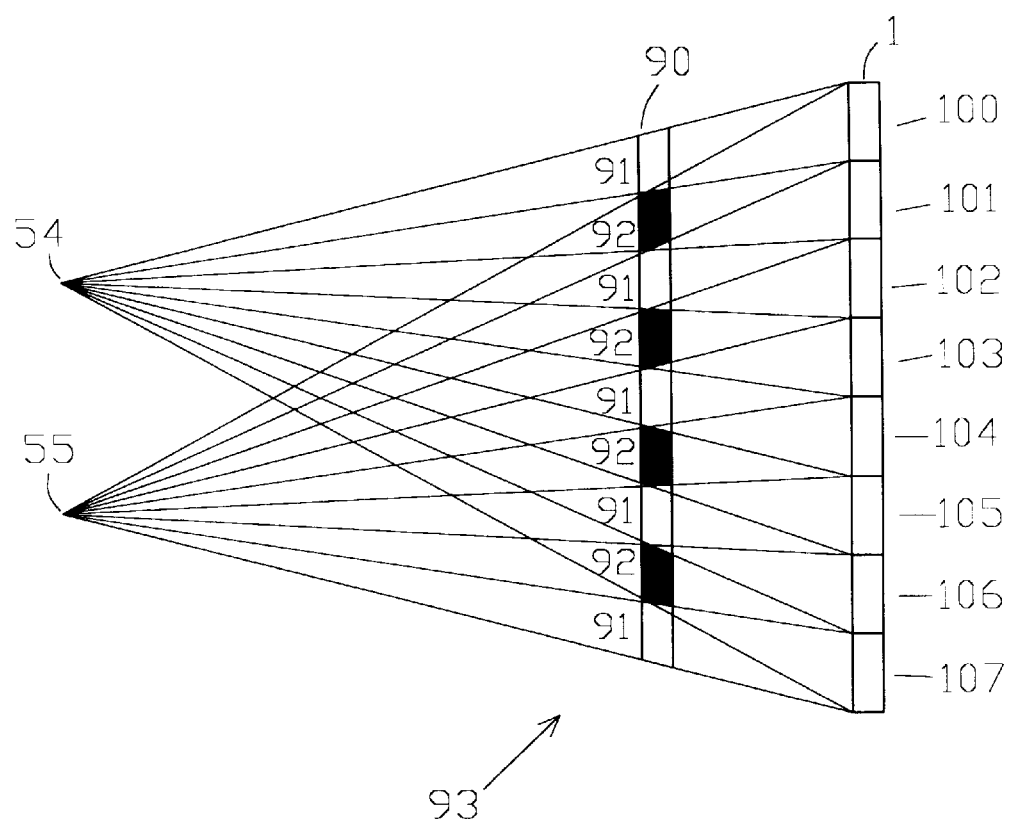
FIG. 15 is a simplified cross-section view of the system according to the sixth embodiment of the present invention in a second phase of operation.

With reference now to FIGS. 13–15, presented is a sixth embodiment of the present invention. The sixth embodiment of the invention provides still another system 93 enabling a flatscreen fullcolor stereoscopic vision without eyeglasses, as accomplished in yet a different manner.

Attention is called to a specific subarea 58, marked in FIG. 6 as 58'. The situation of this particular subarea 58' is unusual. Its position, to the right of left region 52 of the display as seen by left eye 54, and to the left of right region 53 of the display as seen by right eye 55, is such that its function with respect to both eyes is that of blocking the transmission of light. Thus, in the polarization distribution arrangement as defined in FIG. 6, subarea 58' never transmits light to either eye. In other words, this subarea, rather than being polarized at any particular orientation, could in fact simply be opaque.

The situation of subarea 58', and its immediate neighborhood, is reproduced in FIG. 13. As shown, if subarea 58' is opaque, light passing through subarea 59a is visible to left eye 54 and hidden from right eye 55, while light passing through subarea 59b is visible to right eye 55 and hidden from left eye 54.

FIG. 14 shows a generalization of this situation. Here polarization layers 56 and 57 are replaced by a shutter layer 90 divided into alternating subareas 91 and 92. Display 1 is divided into multiple subregions 100–107 in the example of FIG. 14, displaying various portions (i.e., picture elements) of the left and right images as is described hereafter.

Figure 14A:
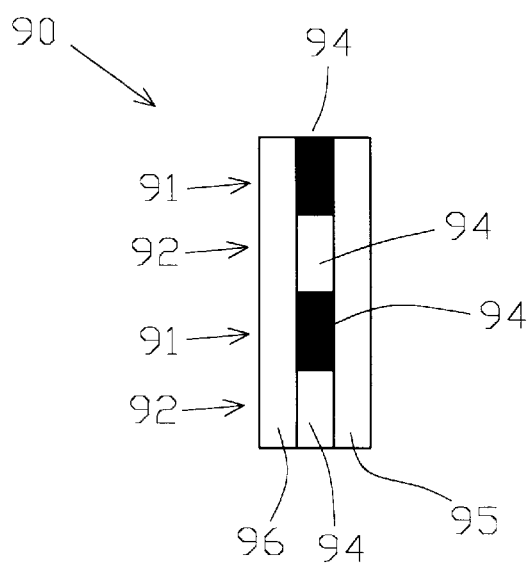
FIG. 14a is a first simplified cross-section view of a switching shutter layer optionally employed in the system of FIG. 14.

Each subarea 91 and 92 of shutter layer 90 may be made either substantially transparent (as shown in white in FIG. 15) or substantially opaque (shown in black in FIG. 15), under electronic control (i.e., via a coordinating element 97). There are various known techniques for accomplishing this. One example shown in FIG. 14a is an arrangement whereby light-rotating means 94 are placed between two light polarizing elements 95 and 96 oriented in the same orientation. When any of the light-rotating means 94 is inactivated (indicated in black in FIG. 14a), light passes through polarizing elements 95 and 96 since they have an identical orientation, and the subarea (92 in the example of FIG. 14a) as a whole is light transparent. When, on the other hand, any of light-rotating means 94 is activated (indicated in white in FIG. 14b), light polarized by first polarizing element 95 and whose orientation is now 90 degrees changed by light-rotating means 94 is unable to pass through second polarizing element 96, and the subarea (91 in the example of FIG. 14a) as a whole is substantially opaque.

Figure 14B:
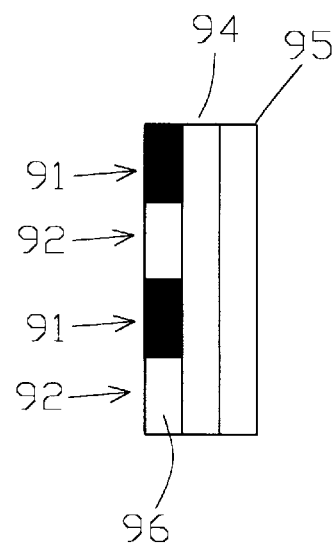
FIG. 14b is a second simplified cross-section view of a switching shutter layer optionally employed in the system of FIG. 14.

Another example to achieve a similar effect as shown in FIG. 14b, is an arrangement whereby a light-rotating means layer 94 is placed between two light polarizing elements 95 and 96 wherein one of the light polarizing elements (96 in the example of FIG. 14b) includes alternating subareas 91 and 92 polarizing light in perpendicular orientations, whereas the other light polarizing layer (95 in the example of FIG. 14b) polarizing light in one of the orientations (the orientation of subareas 92 in the example of FIG. 14b). As is clearly apparent, activating/deactivating layer 94 results in alternating subareas 91 transparent/opaque and at the same time alternating subareas 92 opaque/transparent, respectively.

Each subareas 91 and 92 of the shutter layer 90 is then a shutter unit of the type described above under FIG. 14a or 14b, or of a type in which other technology with the same purpose of creating a unit which is either substantially transparent or substantially opaque under electronic control, and capable of being switched rapidly, is used.

System 93 has two operation phases. In the first phase of operation, subareas 91 of shutter layer 90 are made opaque, while subareas 92 of shutter layer 90 are left transparent. Thus, light emanating from subregions 101, 103, 105, and 107 of display 1 is visible to left eye 54, yet hidden from right eye 55, whereas light emanating from subregions 100, 102, 104, and 106 of display 1 is visible to right eye 55, yet hidden from left eye 54.

In the second phase of the operation of system 93, as depicted in FIG. 15, subareas 92 of shutter layer 90 are made substantially opaque and subareas 91 are made substantially transparent. Thus, light emanating from subregions 100, 102, 104, and 106 of display 1 is now visible to left eye 54 but is not seen by right eye 55, whereas light emanating from subregions 101, 103, 105, and 107 of display 1 is now visible to right eye 55 but is not seen by left eye 54.

If, then, the left image is displayed on display 1 in such a manner that the areas falling in subregions 101, 103, 105, and 107 are displayed during the first phase of the operation as described above, and areas falling in subregions 100, 102, 104, and 106 are displayed during the second phase of the operation as described above, whereas the right image is displayed on display 1 in such a manner that areas falling in subregions 100, 102, 104, and 106 are displayed during the first phase and areas falling in subregions 101, 103, 105, and 107 are displayed during the second phase, and if there is a sufficiently rapid alternation back and forth between the first and the second phases, then the persistence of vision in the human visual system will create the impression that the left eye is seeing the left image in its entirety in a continuous manner, and that the right eye is seeing the right image in its entirety in a continuous manner. As in the other embodiments previously described, if the right and left images represent a scene viewed from two slightly different perspectives, the resultant visual experience can be that of full-screen binocular stereo-optic illusion of depth, with no need for eyeglasses to be worn by the viewer.

As can be seen from the Figures describing the preceding embodiments and as will be further described subsequently, the geometry of the various arrangements of layers of polarizing means and/or of shutter means is dependent on such factors as the distance of the viewer from the display, the distance between the viewer's left eye and his right eye, and his position with respect to the direction of the display.

Figure 16:
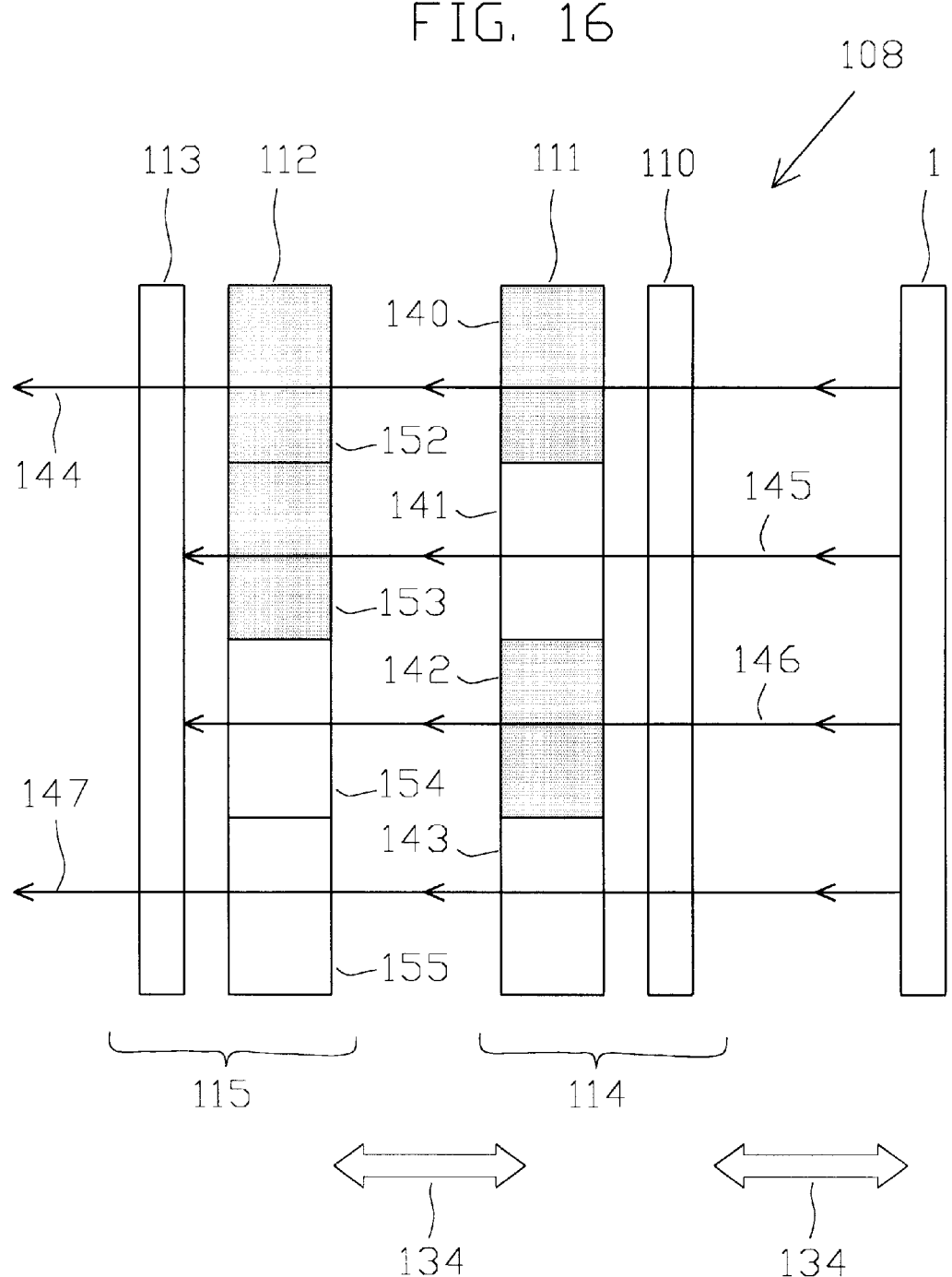
FIG. 16 is a simplified cross-section view of a system for three-dimensional viewing according to a seventh embodiment of the present invention having polarizing layers whose subareas can be modified under electronic control.
Figure 17:
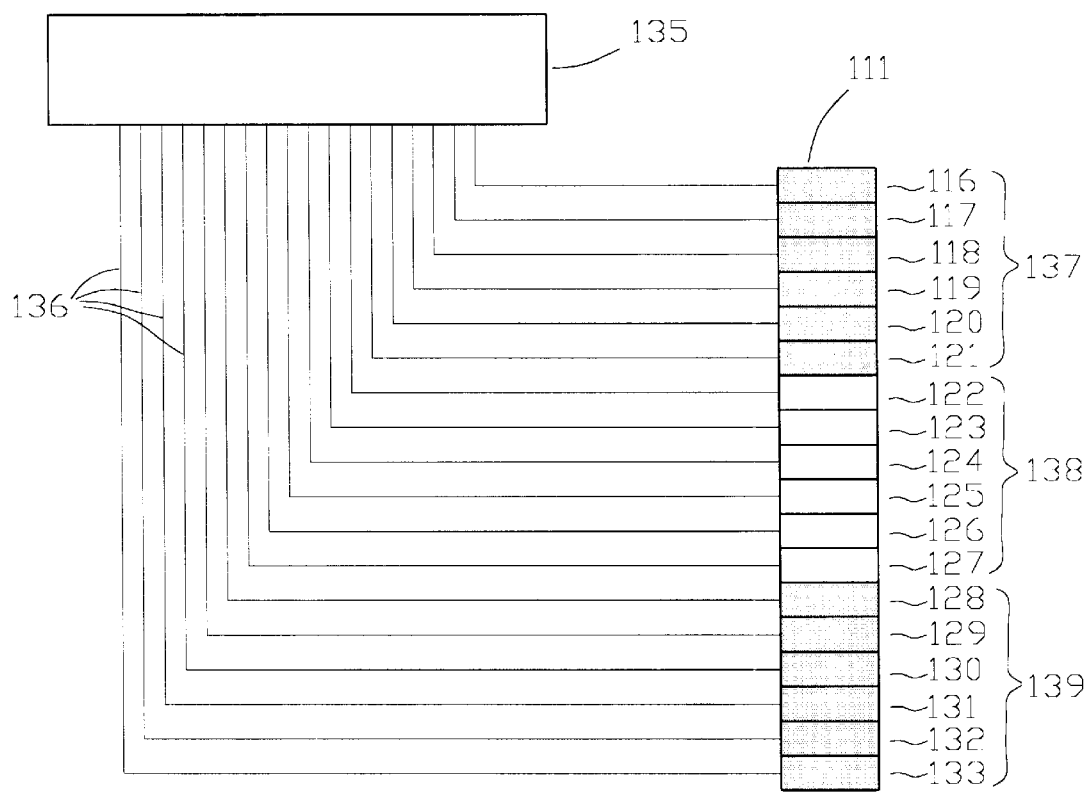
FIG. 17 is a simplified cross section view of a section of a polarizing layer according to the seventh embodiment of the present invention presenting details of a switching mechanism for one such layer.
Figure 18:
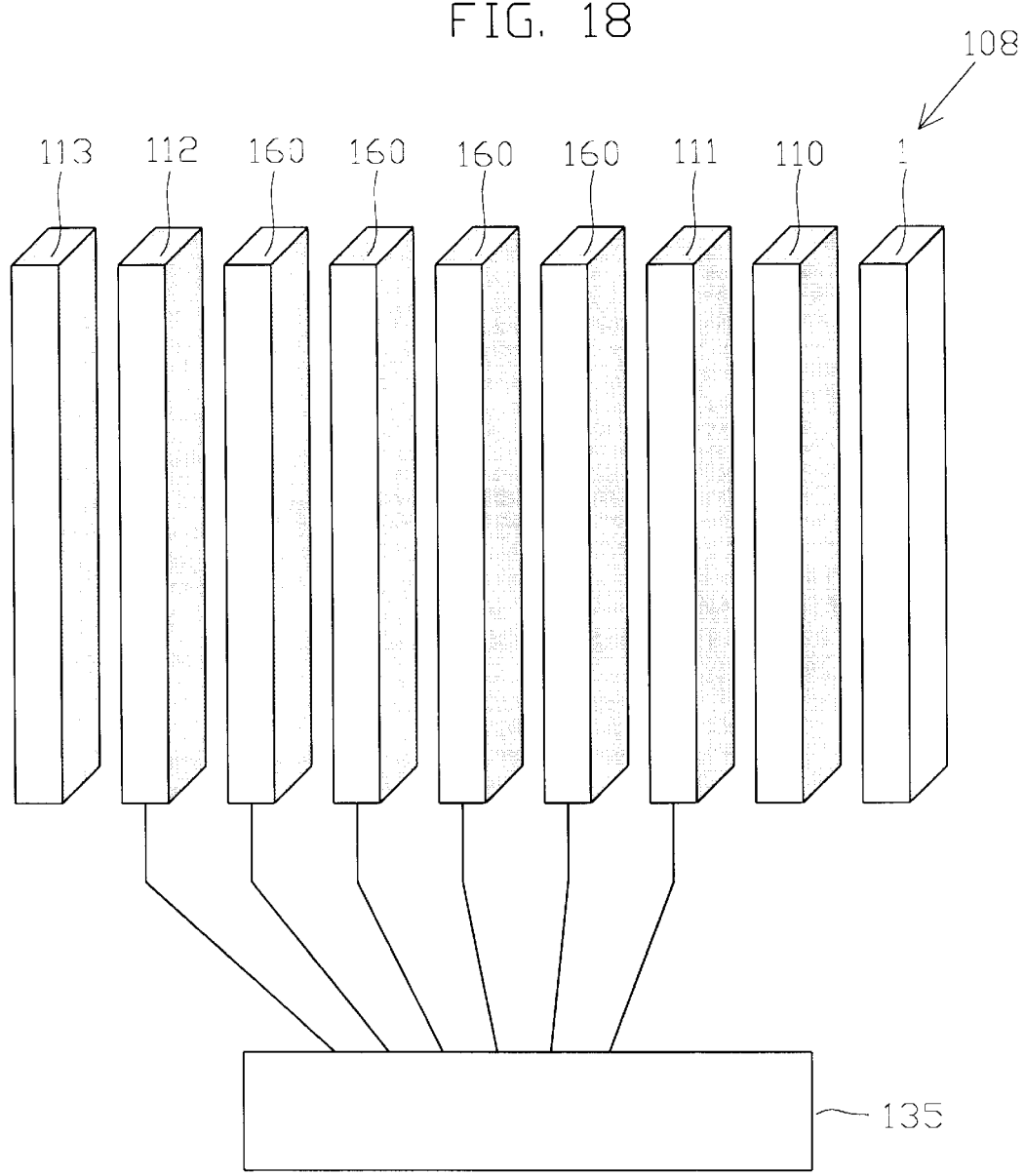
FIG. 18 depicts an array of polarizing layers at varying distances from the display according to the seventh embodiment of the invention.

With reference now to FIGS. 16–18, presented is a seventh embodiment of the present invention. According to the seventh embodiment, systems 50, 70 and 93 described under the fourth through sixth embodiments above are modified so as to be adjustable and thus capable of accommodating various positions and distances of the viewer from the display.

Thus, the seventh embodiment and ones to follow it hereinbelow, incorporate means for varying the geometry of the subareas of polarizing layers (such as layers 56 and 57 of FIG. 6), or of the subareas of shutter layers (such as layer 90 in FIGS. 14–15), under the control of switching means. Accordingly, each subarea is itself composed of a plurality of elements. Depending on the embodiment in which this variable geometry is implemented, each element is either an independently controllable shutter element (an element of "shutter means" as defined), or an independently controllable subarea of light-rotating means capable, when activated, of changing the polarization orientation of polarized light passing through it 90 degrees, or an element composed of a combination of independently controllable light-rotating means combined with a polarizing layer.

As shown in FIG. 16, the seventh embodiment of the present invention is a modification of system 50 of the fourth embodiment described hereinabove, referred to herein as system 108. FIG. 16 may be considered as a schematic view of parts of display 1 and polarizing layers 57 and 56 of FIG. 6, yet in FIG. 16 describing the seventh embodiment, polarizing layers 56 and 57 are modified as follows. Former layer 57 is now labeled 114 whereas former layer 56 is now labeled 115. Layer 114 includes a first and a second sublayers 110 and 111, respectively, whereas layer 115 includes a third and a fourth sublayers 112 and 113, respectively.

Sublayers 110 and 113 are of polarizing means, functioning similarly to layers 56 and 57 as described for FIG. 6, yet in the example of FIG. 16, sublayers 110 and 113 are not themselves divided into subareas with differing polarization orientations, rather both sublayers 110 and 113 pass light polarized in the first orientation throughout the entire sublayer.

Both sublayers 111 and 112 include switchable light-rotating means divided into a plurality of independently switchable elements. FIG. 17 presents a detail view of part of one such sublayer 111, which is divided into a plurality of elements 116–133. Each element 116–133 is independently connected by connecting means 136 to a multi-line controlling switching means 135, by which each element 116–133 of layer 111 may be activated or inactivated. Switching means 135 is typically used to activate groups of elements selected from elements 116–133. In the example given in FIG. 16, elements 116–121 are activated as indicated by their dark color, elements 122–127 are inactive as indicated by their light color and elements 128–133, like elements 116–121 are also activated, etc., creating activated blocks 137 and 139, and inactive block 138. Blocks 137–139 of elements 116–133 of layer 111, both active and inactive, are used in conjunction with polarizing sublayer 110 to produce the functionality described for layer 57 of FIG. 6.

Sublayer 112, like sublayer 111 is also constructed according to as shown in FIG. 17 and described hereinabove for sublayer 111, and the active and inactive blocks of layer 112, are similarly used in conjunction with polarizing sublayer 113, to produce the functionality described for layer 56 of FIG. 6.

As shown in FIG. 16 and described above, layer 114 is constructed of two sublayers, sublayer 110 of polarizing means, polarizing light in the first orientation, and sublayer 111 of switchable light-rotating means constructed as described in FIG. 17. Subareas 140 and 142 (each made of a plurality of elements not detailed in FIG. 16) are marked dark as being activated (that is, each of the elements of which each of subareas 140 and 142 are composed of is activated), whereas subareas 141 and 143 are marked light as being inactivated.

As further shown, layer 115, like layer 114 is also constructed of two sublayers, sublayer 113 of polarizing means, polarizing light in the second orientation, and sublayer 112 of switchable light-rotating means constructed as described for sublayer 111 in FIG. 17. Subareas 152 and 153 (each made of a plurality of elements not detailed in FIG. 16) are marked dark as being activated (that is, each of the elements of which each of subareas 152 and 153 are composed is activated), whereas subareas 154 and 155 are marked light as being inactivated.

Lines 144, 145, 146, and 147 represent four possible combinations of activation/inactivation which can be encountered by rays of light originating from display 1, traversing layer 114 and then encountering layer 115 while traveling in the direction of the viewer's eyes. Light ray 144 encounters activated regions in both sublayer 111 and 112, light ray 145 encounters an activated region only in sublayer 112, light ray 146 encounters an activated region only in sublayer 111, and light ray 147 encounters no activated regions.

Since in the example of FIG. 16, polarizing sublayer 110 polarizes light in the first orientation, it is apparent that for subareas of layer 114 in which layer 111 is not activated (e.g., subareas 141 and 143 in FIG. 16), layer 114 as a whole functions just like subareas 58 of layer 57 of FIG. 6. Thus, sublayer 110 polarizes light passing through it in the first orientation, and the non-activated subarea (141 or 143) of layer 111 makes no changes the polarization of that light As for rays of light passing through areas of layer 114 for which sublayer 111 is activated (e.g., subareas 140 and 142 in FIG. 16), the situation is different. These rays are also polarized in the first orientation by their passage through sublayer 110, but then they are rotated 90 degrees into the second orientation by the activated subareas 140 or 142 of sublayer 111 through which they pass. Thus, these activated subareas of layer 114 have the same functionality as subareas 59 of layer 57 of FIG. 6.

Consideration is now focused on these light rays as they progress to layer 115. Due to the effect of layer 114, light ray 144 arrives at layer 115 polarized in the second orientation. There light ray 144 encounters activated subarea 152 of switchable rotating sublayer 112. Activated sublayer 112 rotates light ray 144 90 degrees back to the first orientation. Light ray 144 proceeds onto polarizing sublayer 113 having the first orientation, which sublayer 113 consequently passes ray 144 on towards the viewer's eye. Light ray 145, which is polarized in the first orientation after passing through layer 114, as described above, encounters activated subarea 153 of sublayer 112, which 90 degrees rotates it to the second orientation. This light ray then encounters sublayer 113 which has the first orientation, and consequently is blocked and goes no further. Light ray 146 arrives at layer 115 polarized at the first orientation, encounters sublayer 113 and is blocked. Light ray 147 arrives at layer 115 polarized at the first orientation. It's polarization is unchanged by inactivated subarea 155 of sublayer 112, thus, it is then passed on through sublayer 113 and proceeds onto the viewer's eye. From the above description it is clear that sublayer 113 functions as an analyzing filter for polarized light.

Thus, for subareas of layer 112 which are inactivated at a given time, layer 115 as a whole passes light of the first orientation and blocks light of the second orientation, whereas for subareas of layer 112 which are activated at that time, layer 115 as a whole passes light of the second orientation and blocks light of the first orientation. In other words, for subareas where layer 112 is inactivated, layer 115 behaves like subareas 58 of layer 56 of FIG. 6, whereas in subareas where layer 112 is activated, layer 115 behaves like subareas 59 of layer 56 of FIG. 6.

Hence, layer 115 of FIG. 16 provides the same functionality as that described for layer 56 of FIG. 6, whereas layer 114 provides the same functionality as that described for layer 57 of FIG. 6.

Yet, in contradistinction to system 50 of the fourth embodiment presented in FIG. 6, according to the present seventh embodiment, the sizes and placements of the various subareas are not physically fixed by the material construction, rather these sizes and placements are subject to configuration using multiple switching means 135, as described in the discussion of FIG. 17.

Consequently, the size and placement of activated and inactivated subareas of layers 111 and 112 of FIG. 16 can be varied under electronic control. In turn, the various subareas can now be effectively modified in such ways that various aspects of the geometry of the embodiment can be adjusted to the convenience of the viewer, taking into account his position, personal characteristics as the distance between his eyes, the degree to which he tends to move his head while watching the display, and various other considerations of convenience and taste.

A remaining dimension in which one might wish to vary the system presented in FIGS. 16 and 17 is the distance between layers 114 and 115 (or layers 56 and 57 in FIG. 6), and between these layers and display 1. This can be accomplished in two alternative ways.

Firstly, as indicated by arrows 134 mechanical means may be used to simply slide the layers closer together or further apart from one another and from display 1.

Secondly, with reference now to FIG. 18, accomplishing the same purpose under electronic control with no moving parts involved is described. As shown in FIG. 18, multiple layers 160 each identical to layer 111 (or 112) are placed between sublayers 111 and 112. Since any of sublayers 111, 112 or 160 have no substantial influence on the light unless they are activated, and since each layer by definition can be activated or not activated under control of electronic switching means 135, any pair from among the sublayers 111, 112 and 160 can be used as described for layers 111 and 112 in FIG. 6. Thus, it will be appreciated that not only do layers constructed as in FIG. 17 allow for flexibility in the size and placement of subareas along the orientation of their construction, but that an array of such layers along the axis joining the viewer and the display provides for flexibility in fixing the distance of the active layer one from the other and their distance from the display.

Since the construction principles elucidated in FIG. 17 can in fact refer to elements (e.g., layers) of arbitrary shape, and in particular to elements which could be organized in a checkerboard pattern rather than in a pattern of strips as described in FIG. 17, it is clear that the arrangement gives total flexibility, under electronic control, concerning the placement and spacing of the active layers of the device.

Figure 19:
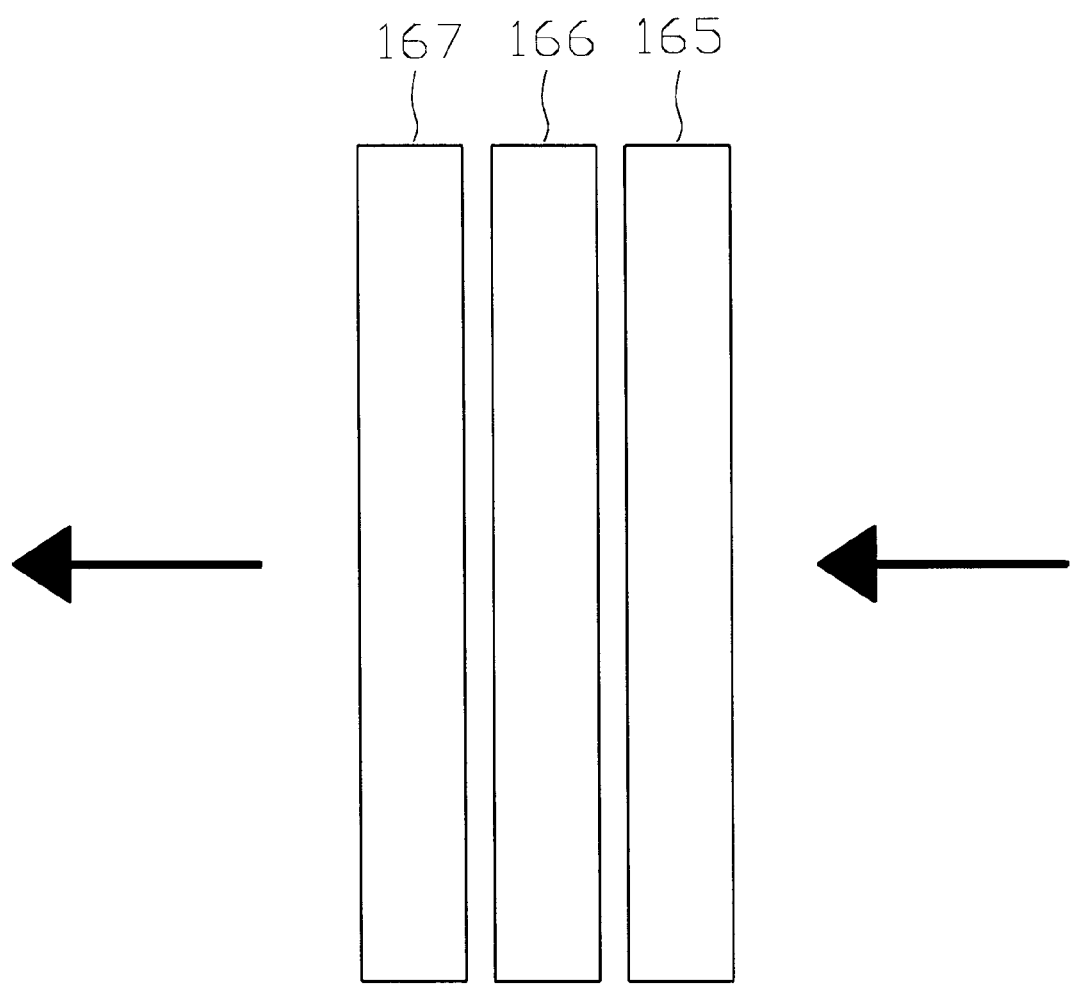
FIG. 19 is a a simplified cross-section view of a subarea of a shutter layer.
Figure 20:
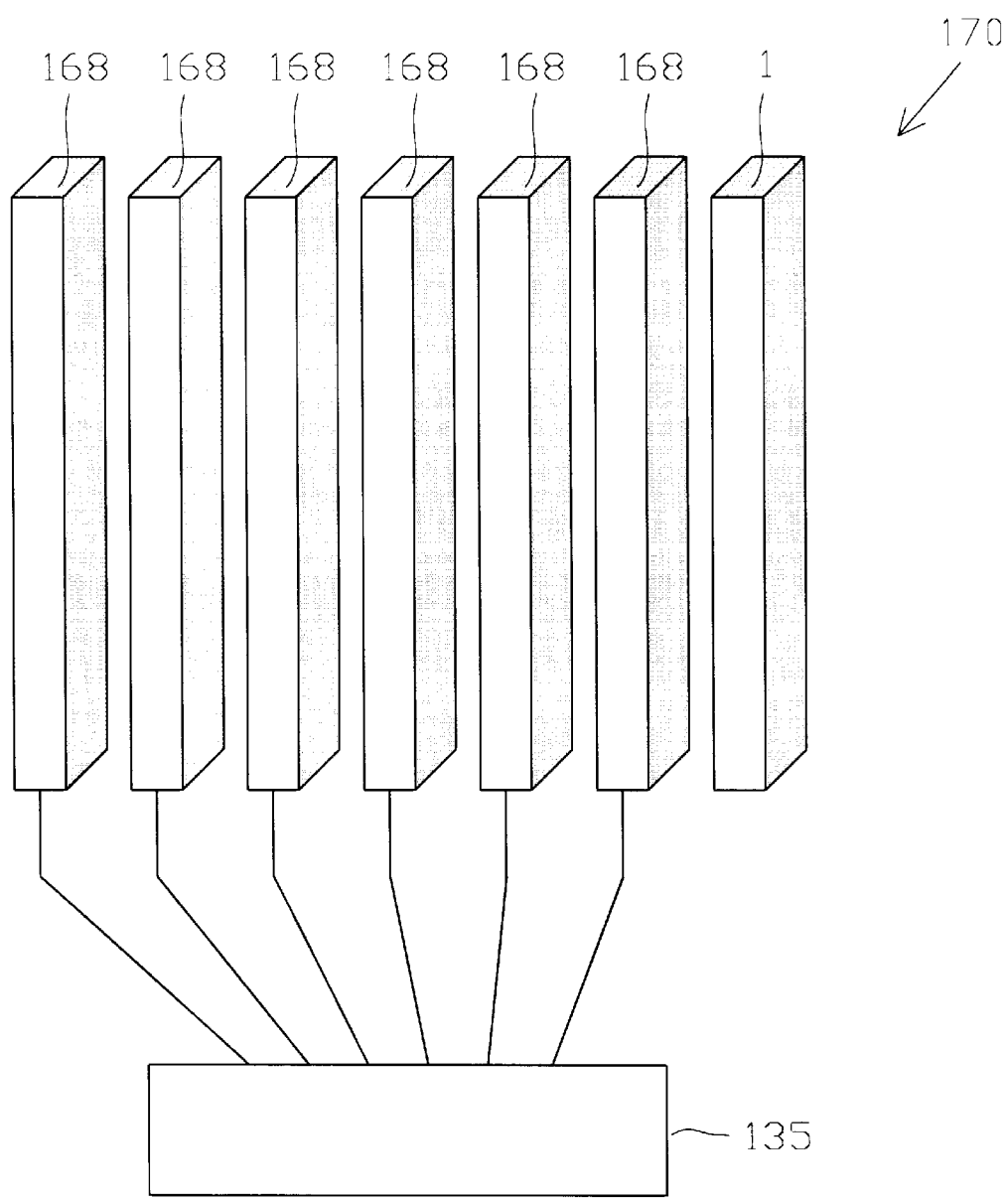
FIG. 20 depicts an array of shutter layers at varying distances from the display according to an eighth embodiment of the present invention.

With reference now to FIGS. 19–20, presented is an eighth embodiment of the present invention. According to the eight embodiment provided is a system 170 to enable flexibility of the internal geometry of system 93 as described above under the sixth embodiment of the present invention (FIGS. 14–15). As shown in FIGS. 14–15, shutter means formed as layer 90 having subareas capable of being turned on/off under electronic control. As shown in FIG. 14a and described above, one method for constructing such shutter means is to sandwich a layer of switchable light-rotating material (i.e., providing what is known in the art as the Kerr effect) between two light polarizing layers having the same orientation, as now redepicted in FIG. 19. Thus, light entering a first polarizing layer 165 having a first orientation traverses a switchable light-rotating layer 166. If layer 166 is inactivated, the light is unaffected and passes freely through a second polarizing layer 167, itself also oriented in the first orientation. If, on the other hand, layer 166 is activated, then the orientation of the polarized light passing through it is rotated 90 degrees, giving the light the second orientation. This light is then blocked by polarizing layer 167 which has the first orientation.

It will be appreciate that layer 166 can be constructed similar to layer 111 as described in FIG. 17, and that consequently it can be divided into subareas as desired, controlling each of the subareas under electronic control. Thus, the size and spacing of the subareas (as used in FIGS. 14 and 15) can be adjusted according to the convenience, placement, and personal characteristics and preferences of the viewer.

It may be noted that here, as with the preceding seventh embodiment, the flexibility provided in varying over time the choice of elements involved in each subarea provides great versatility in the use of these elements. For example, rather than simply assigning sets of elements to subareas and then switching the subareas on/off as blocks, as was described in FIGS. 14 and 15, one might create a light-blocking subareas of a particular width, and then add individual elements to one side of the blocking subarea while removing (inactivating) elements from the other side of the blocking subarea, with the effect of causing the light-blocking subarea (or block) to be translated along the layer. This effect may be useful, for example, to accommodate viewers whose position is too far from the display to allow the size of blocking blocks to be comparable to the size of pixels on the display.

In another example, the schemes described above for the sixth embodiment i.e., hiding and showing particular images to particular eyes at particular times might be altered to accommodate for distant viewers by leaving alternate pixels on the display totally inactivated, i.e., not used for either image, during particular phases, and then adjusting the size of unblocked subareas on the shutter to be greater than the size of the pixels, so as to reduce diffraction effects.

As for the seventh embodiment, the eighth embodiment too can provide flexibility along the axis stretching between the viewer and the display. As shown in FIG. 20, light emanating from the display 1 and directed towards the user's eye encounters a plurality of shutter layers 168, each of which is constructed as described above and depicted in FIG. 19. This arrangement provides system 93 of the fifth embodiment (as described by FIGS. 14–15) flexibility in the placement of the shutter layers along the axis joining the viewer and the display, just as the arrangement shown in FIG. 18 provided such flexibility for the fourth embodiment of the present invention.

Figure 21:
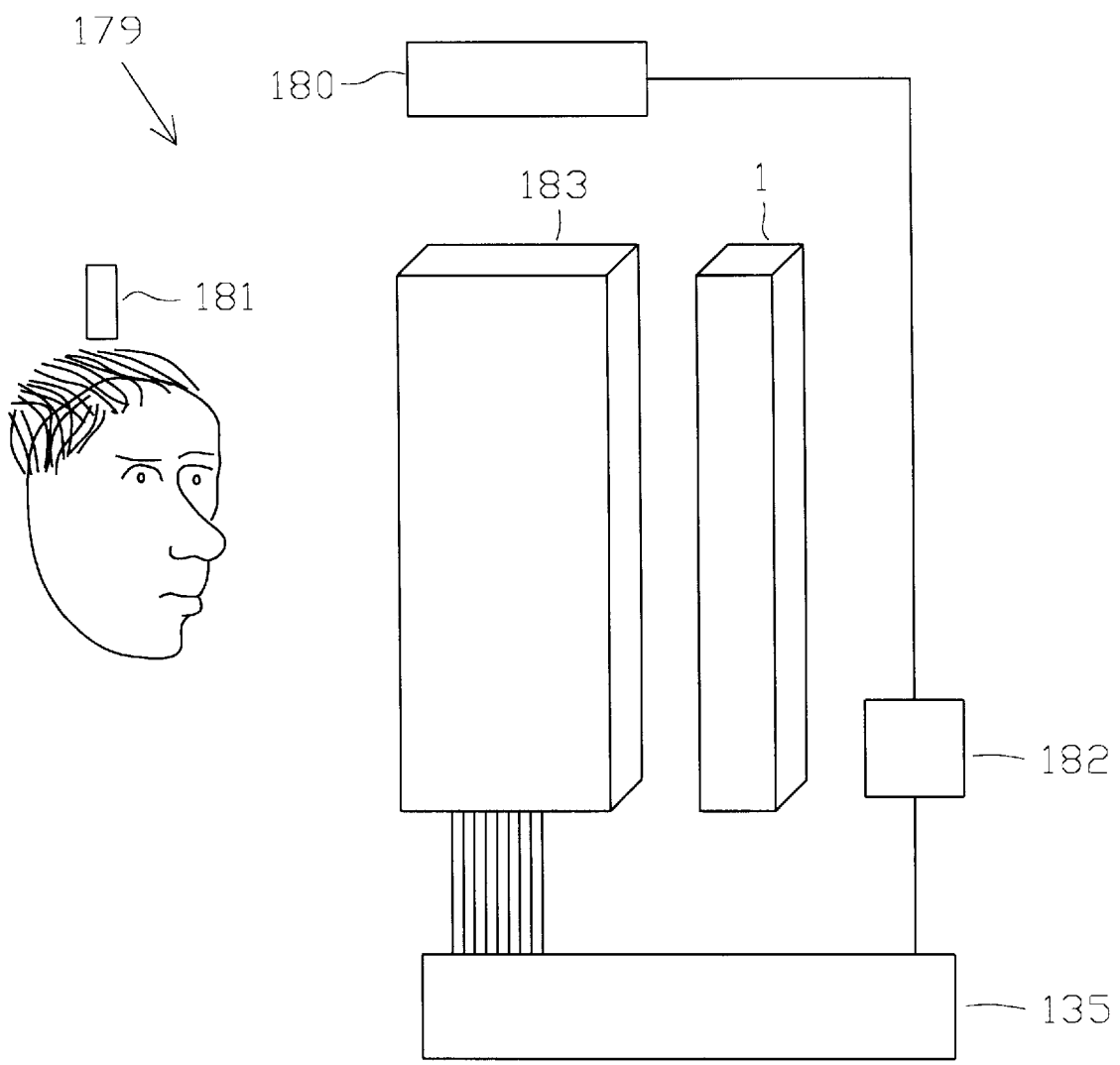
FIG. 21 depicts means to control a system for three-dimensional viewing whose internal arrangements of subareas are modified automatically under the control of means for sensing the position of the viewer with respect to the system.

With reference now to FIG. 21, presented is a ninth embodiment of the present invention. According to the ninth embodiment, provided is means 179 for sensing the position of the viewer with respect to the display, and using that information, as interpreted by programmed computing means 182, to control switching means 135. As is recalled from FIGS. 17, 18, and 20, switching means 135 is used to modify the size and placement of the various subareas of the various layers (grouped together in FIG. 21 under 183) in order to adapt the system to the position of the viewer with respect to the display.

There are a variety of known techniques whereby the position of the user can be sensed. For one example, a "three-dimensional mouse" 181, marketed by Pegasus Ltd. corporation of Jerusalem Israel, is capable of reporting its location in three dimensions with respect to a predefined origin point. If "mouse" 181 was worn by the viewer in a manner which retains a fixed relationship between the position of "mouse" 181 and the position of the viewer's eyes, and the system were then calibrated to take into account the relationship between the position of mouse 181 and the position of the eyes, then by simple calculation the position of the eyes with respect to the system can be determined.

Another technique which might be used would be the wearing of a pin with a pair of emitters of infrared or visible light, coupled with a sensor capable of reporting the angle of the emitter with respect to the system, and the angular distance between the two emitters (from which its distance may be calculated). For a more complex but more convenient example, given a video camera 180 mounted on the system and pointing generally in the direction of the viewer, computing means can be programmed to identify the viewer's face in the received picture, and the eyes within the face. Once calibrated, such a system could report the direction of the eyes with respect to the display, and, by triangulation, their distance.

The information generated by any such system for determining the placement of a viewer with respect to the apparatus can then be used, subsequent to appropriate calculation, to determine which elements are to be activated by switching means 135 to produce the desired configuration.

Figure 22:
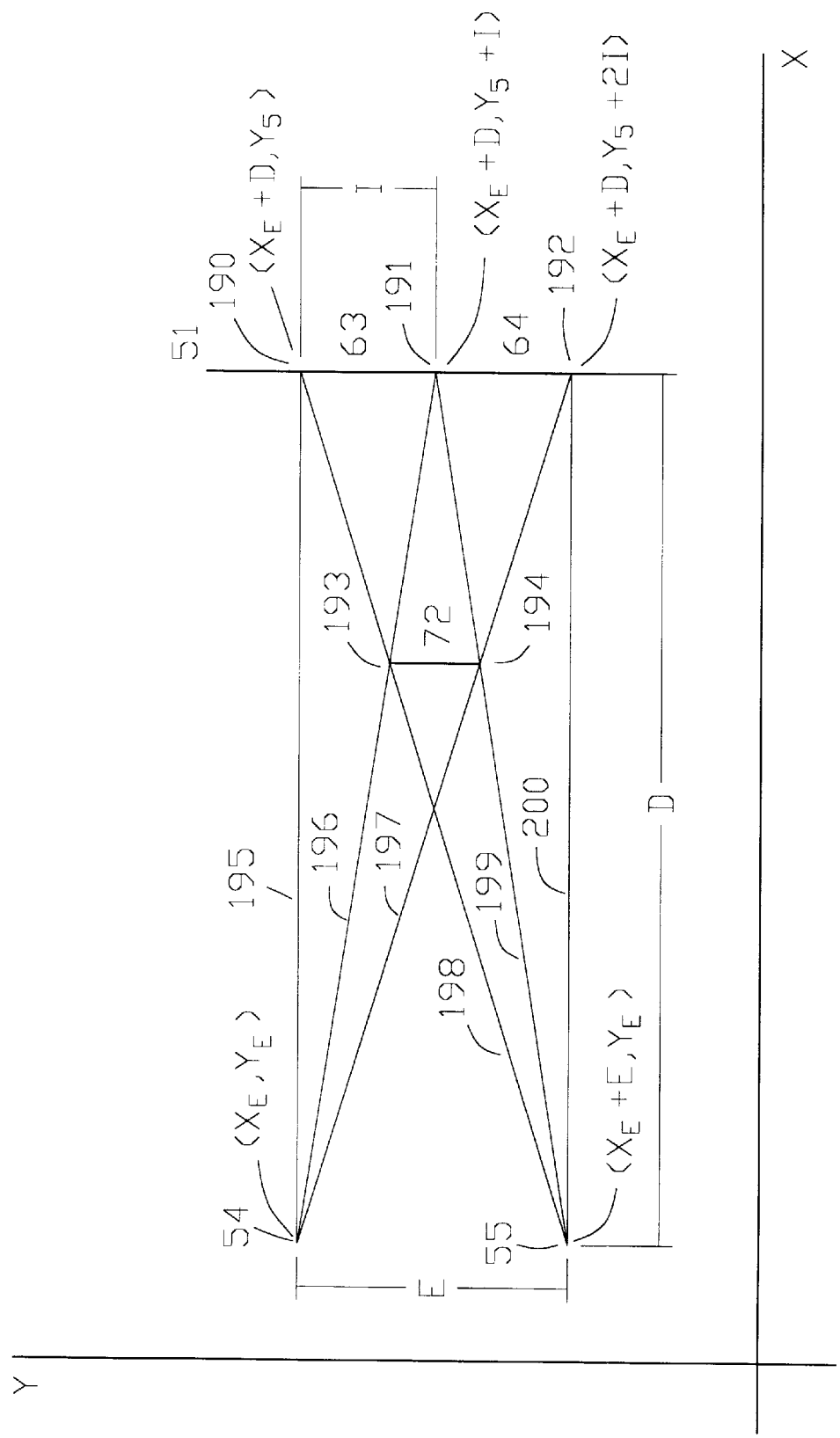
FIG. 22 depicts part of a system for three-dimensional viewing in Cartesian coordinates, as a basis for distance and size calculations.

FIG. 22 shows an example of how distance and position information can be used in calculation. The following paragraph refers to the terms of FIGS. 13–15 and the sixth embodiment, but clearly can be generalized to the other embodiments in obvious manner.

In FIG. 22 a representative area from FIG. 13 is shown in the context of Cartesian x/y coordinates. Let E be the distance between left eye 54 and right eye 55, D the distance between each of eyes 54 and 55 and display 1, and I the length of segment of image (63, 64) on the display, and if the position of left eye 54 is $(X_E, Y_E)$, and if the height 63 of the start of a given segment on the display is taken to be $(Y_S)$, then the following coordinates describe the associated points on the Figure:

$(X_E, Y_E+E)$ is the position of the right eye 55;
$(X_E+D, Y_S)$ is the position of point 190 on the display;
$(X_E+D, Y_S+1)$ is the position of point 191 on the display;
$(X_E+D, Y_S+2I)$ is the position of point 192 on the display;
$(X_E+D, Y_S+nI)$ is the position for the "n"th succeeding point on the display.

Simple algebra can now be used to derive equations for each of the lines-of-sight (195, 196, 197, 198, 199, 200) appearing in FIG. 22, and for any similar lines extending above and below the section of the system depicted.

Solving the simultaneous equations for lines of sight 196 and 198 yields point 193. Solving the equations for lines of sight 197 and 199 yields point 194. Points 193 and 194 are the endpoints of shutter segment 72. Once points 193 and 194 are known, the position and the length of shutter segment 72 has been determined.

In this manner, given information about the position of the eyes with respect to the display, the size of the display, and the number of areas into which the image is to be divided, one can calculate the position of the shutter layer and the appropriate configuration of its internal subdivisions. In similar manner, given information about the position of the eyes, the size and position of the display, and the position and orientation of shutter layer 90, one can calculate the sizes and positions for the subareas into which shutter layer 90, and the image being displayed on display 1 must be divided.

As heretofore described, switching means 135 can select elements of rotating means which are activated in the context of the seventh and eighth embodiments, thereby adapting the internal geometry of layers and subareas of those embodiments to the distance and angle of view of the viewer. Since these processes are all controlled at electronic speeds, the internal geometry of the system can adapt to changes in the viewer's position on an ongoing basis.

Hence, the invention described by way of example hereinabove is directed toward systems for three-dimensional viewing aimed at providing means for flatscreen fullcolor stereoscopic vision without eyeglasses or other optical means engaged close to the eyes of the viewer. Furthermore, some of the systems for three-dimensional viewing according to the present invention do not restrict the viewer to a specific position and distance relative to the display, which viewer is thus free to move his head while viewing the display. Yet furthermore, the more advanced systems of the present invention are highly suitable for three-dimensional viewing both for still and motion pictures, yet in contrast with prior art systems do not involve moving parts, some may even be installed on existing hardware such as computers and television sets.

While the invention has been described with respect to a limited number of embodiments, it will be appreciated that many variations, modifications and other applications of the invention may be made.

What is claimed is:

1. A system for three-dimensional viewing of an unpolarized light emitting display, the display presents a frame divided into at least one left region presenting at least a part of a first image and at least one right region presenting at least a part of a second image, the system comprising a first and a second light polarizing layers each being divided into a plurality of first subareas and a plurality of second subareas, said plurality of first subareas polarizing light in a first orientation, said plurality of second subareas polarizing light in a second orientation, said first layer being closest to the display, said first layer being for polarizing the unpolarized light emitted from the display, said second layer being between said first layer and a viewer, said first and second layers being in a distance from one another and said plurality of first and second subareas being distributed across and along said first and second layers such that light emanating from the at least one left region reaches one of the eyes of the viewer and is substantially blocked from the other eye, whereas light emanating from the at least one right region reaches the other eye of the viewer and is substantially blocked from the first eye, wherein said second layer is constructed such that, at any given time, light passing through at least some of said subareas of said second layer reaches either of the eyes of the viewer.

2. A system for three-dimensional viewing as in claim 1, wherein said light polarization is selected from the group consisting of linear light polarization wherein said first orientation is substantially perpendicular to said second orientation and circular light polarization wherein said first orientation is substantially opposite in sense to said second orientation.

3. A system for three-dimensional viewing as in claim 1, wherein said first image is a left image and said second image is a right image.

4. A system for three-dimensional viewing as in claim 1, wherein said first image is a right image and said second image is a left image.

5. A system for three-dimensional viewing of a polarized light emitting display, the display presents a frame divided into at least one left region presenting at least a part of a first image and at least one right region presenting at least a part of a second image, the system comprising a first and a second layers each being divided into a plurality of first subareas and a plurality of second subareas, said plurality of first subareas of said first layer retarding light ninety degrees with respect to light passing through said second subareas of said first layer, said plurality of first subareas of said second layer polarizing light in a first orientation, said plurality of second subareas of said second layer polarizing light in a second orientation, said first layer being closest to the display, said second layer being between said first layer and a viewer, said first and second layers being in a distance from one another and said plurality of first and second subareas being distributed across and along said first and second layers such that light emanating from the at least one left region reaches one of the eyes of the viewer and is substantially blocked from the other eye, whereas light emanating from the at least one right region reaches the other eye of the viewer and is substantially blocked from the first eye, wherein said second layer is constructed such that, at any given time, light passing through at least some of said subareas of said second layer reaches either of the eyes of the viewer.

6. A system for three-dimensional viewing as in claim 5, wherein said light polarization is selected from the group consisting of linear light polarization wherein said first orientation is substantially perpendicular to said second orientation and circular light polarization wherein said first orientation is substantially opposite in sense to said second orientation.

7. A system for three-dimensional viewing as in claim 5, wherein said first image is a left image and said second image is a right image.

8. A system for three-dimensional viewing as in claim 5, wherein said first image is a right image and said second image is a left image.

* * * * *

Disclaimer 5,973,831—Paul Kleinberger; Ilan D. Kleinberger, both of Jerusalem, Israel. SYSTEMS FOR THREE-DIMENSIONAL VIEWING USING LIGHT POLARIZING LAYERS. Patent dated October 26, 1999. Disclaimer filed November 10, 1999, by the inventor.

Hereby enters this disclaimer to claims 1-8, of said patent.

*(Official Gazette, May 1, 2001)*